(12) United States Patent
Mogi

(10) Patent No.: US 11,550,203 B2
(45) Date of Patent: Jan. 10, 2023

(54) OBSERVATION APPARATUS AND IMAGE PICKUP APPARATUS HAVING THE SAME

(71) Applicant: CANON KABUSHIKI KAISHA, Tokyo (JP)

(72) Inventor: Shuichi Mogi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/380,546

(22) Filed: Jul. 20, 2021

(65) Prior Publication Data
US 2022/0035139 A1 Feb. 3, 2022

(30) Foreign Application Priority Data
Jul. 30, 2020 (JP) .............................. JP2020-129660

(51) Int. Cl.
*G03B 13/06* (2021.01)
*G03B 13/02* (2021.01)
*G02B 13/16* (2006.01)

(52) U.S. Cl.
CPC ............. *G03B 13/06* (2013.01); *G02B 13/16* (2013.01); *G03B 13/02* (2013.01); *G03B 2213/025* (2013.01)

(58) Field of Classification Search
CPC .. G03B 13/02; G03B 13/06; G03B 2213/025; G02B 13/16
See application file for complete search history.

(56) References Cited

U.S. PATENT DOCUMENTS

| 2,340,623 A * | 2/1944 | Simmon ................ G03B 13/06 396/141 |
| 5,598,248 A * | 1/1997 | Nagano ................. G03B 13/02 396/296 |
| 2012/0038991 A1* | 2/2012 | Miyano ................. G02B 23/14 359/643 |
| 2019/0271900 A1* | 9/2019 | Takumi ................. G02B 23/14 |
| 2022/0057600 A1* | 2/2022 | Mogi ..................... G02B 13/16 |

FOREIGN PATENT DOCUMENTS

| JP | 7-92375 A | 4/1995 | |
| JP | 3143553 B2 | 3/2001 | |
| JP | 2001290087 A * | 10/2001 | ............. G03B 13/06 |

* cited by examiner

*Primary Examiner* — Christopher E Mahoney
(74) *Attorney, Agent, or Firm* — Canon U.S.A., Inc. IP Division

(57) ABSTRACT

An observation apparatus includes an observation optical system and a line of sight detection system. The observation optical system includes, in order from a display element side to an observation side, an optical path splitter configured to split an optical path, and a first lens unit having a positive refractive power. The line of sight detection system includes a second lens unit configured to image light incident on the first lens unit and split by the optical path splitter. A predetermined condition is satisfied.

16 Claims, 13 Drawing Sheets

OBSERVATION APPARATUS AND IMAGE PICKUP APPARATUS HAVING THE SAME

BACKGROUND OF THE DISCLOSURE

Field of the Disclosure

The aspect of the embodiments relates to an observation apparatus and an image pickup apparatus having the same.

Description of the Related Art

In order to magnify and observe an image displayed by a display element, such as a liquid crystal panel and an organic EL panel using an organic electroluminescence (EL) film, observation apparatuses have conventionally been proposed which have an observation optical system including a plurality of lenses. One recently disclosed observation apparatus includes an optical path splitter that splits an optical path and a line of sight detection system that detects a direction of a line of sight of a photographer (see Japanese Patent Laid-Open No. 7-92375 and Japanese Patent No. 3143553).

When the optical path is split by a prism as in the observation apparatus disclosed in Japanese Patent Laid-Open No. 7-92375, it is difficult for an electronic viewfinder used for a mirrorless cameras and the like to secure a sufficient view angle and loupe magnification because a focal length of the observation optical system is not properly set. When the optical path is split by a mirror as in the observation apparatus disclosed in Japanese Patent No. 3143553, it is difficult to pursue a high performance of the observation optical system (a high definition, a sufficiently magnified viewfinder image through a loupe magnification, a wide field of view, and a sufficient eye point length) because it is necessary to extend an optical path length in the observation optical system. In addition, since a relatively small display element that is used to magnify and observe an image is likely to shorten the focal length of the observation optical system, the extended optical path length of the observation optical system further prevents the high performance of the observation optical system.

SUMMARY OF THE DISCLOSURE

An observation apparatus according to one aspect of the embodiments includes an observation optical system and a line of sight detection system. The observation optical system includes, in order from a display element side to an observation side, an optical path splitter configured to split an optical path, and a first lens unit having a positive refractive power. The line of sight detection system includes a second lens unit configured to image light incident on the first lens unit and split by the optical path splitter. The following inequalities are satisfied:

$$0.4 < L/f1 < 2.0$$

$$11 < \beta r < 16$$

$$\beta r = 250 \text{ [mm]}/f1$$

where L is a distance on an optical axis from a rear principal point position of the first lens unit to a lens surface closest to an observation position of the second lens unit, f1 is a focal length of the first lens unit, and βr is a loupe magnification of the first lens unit.

An image pickup apparatus having the above observation apparatus also constitutes another aspect of the embodiments.

Further features of the disclosure will become apparent from the following description of exemplary embodiments with reference to the attached drawings.

DESCRIPTION OF THE EMBODIMENTS

Figure 1:
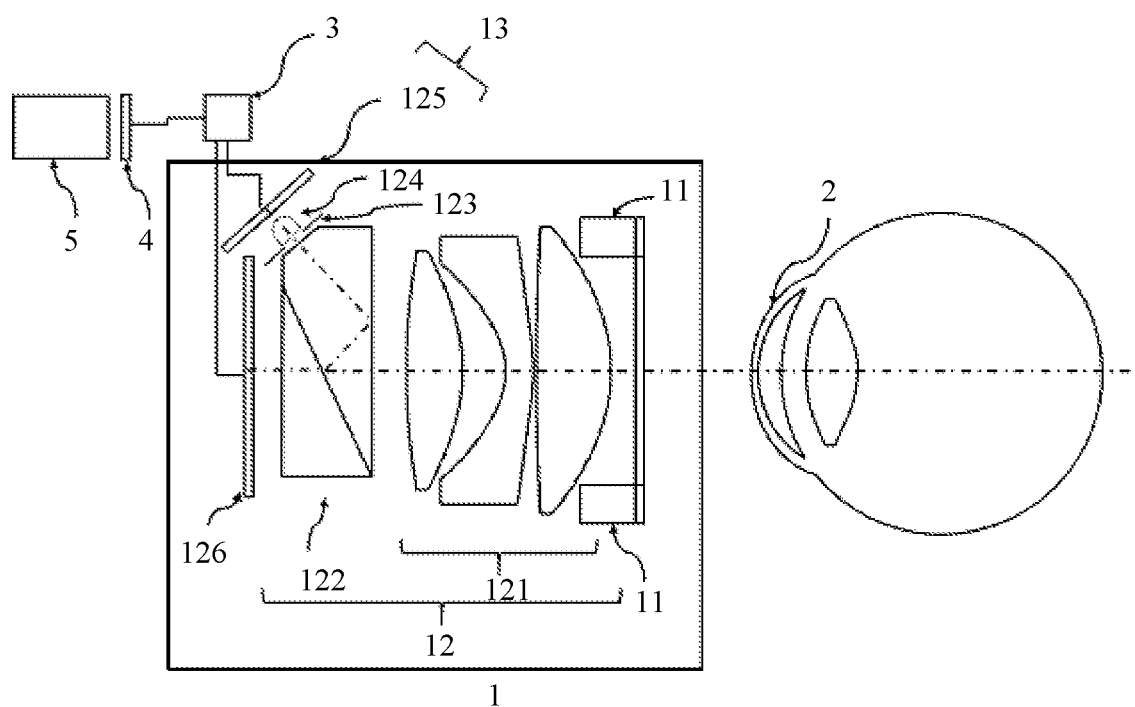
FIG. 1 is a schematic view of an observation apparatus according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a schematic view of an observation apparatus 1 according to one embodiment of the disclosure. An image pickup apparatus includes the observation apparatus 1, a signal processing system 3, an image sensor 4, and an imaging lens (optical system) 5. The image sensor 4 includes a CCD sensor, a CMOS sensor, or the like, receives an image formed by the imaging lens 5, and converts the received image into an electric signal.

The observation apparatus 1 includes an infrared light emitting light source (infrared LED) 11, an observation optical system 12 that guides an image displayed on a display element (display panel) 126 such as a liquid crystal display element and an organic EL to an eyeball 2 of the observer, and a line of sight (visual line) detection system 13 that images the eyeball 2 of the observer and detects the line of sight (line of sight direction).

The observation optical system 12 includes, in order from the side of the display element 126 (display element side) to the side of the observer's eyeball 2 (observation side), an optical path splitter 122 configured to split an optical path, and a first lens unit 121 having a positive refractive power. In this embodiment, the optical path splitter 122 includes a prism. The image displayed on the display element 126 is guided to the eyeball 2 of the observer in a magnified state by the optical path splitter 122 and the first lens unit 121. The diopter of the observation optical system 12 is adjustable by moving the first lens unit 121 integrally in the optical axis direction. The optical path splitter 122 may include a roof prism for a compact structure and a low profile. The optical path splitter 122 may include a dichroic mirror for a weight reduction.

Figure 2:
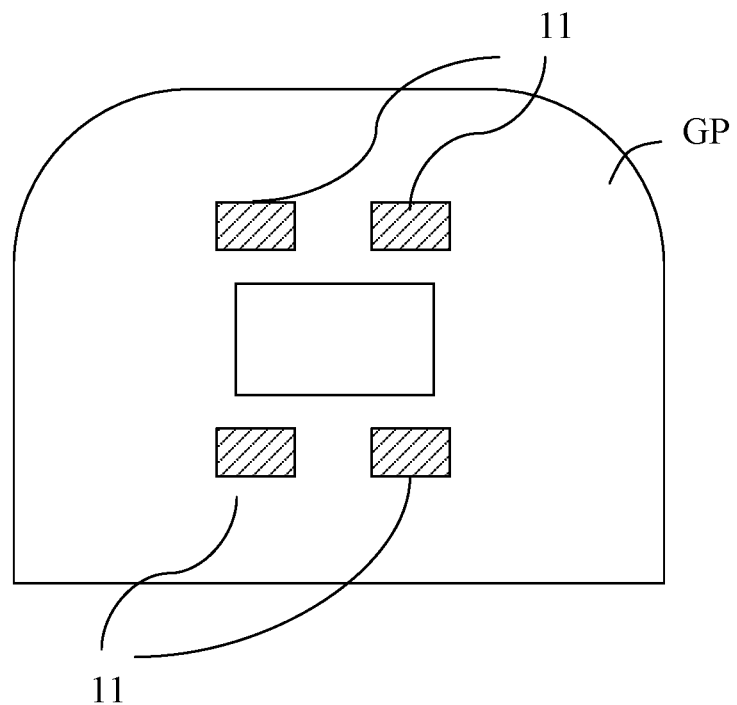
FIG. 2 is a front view of an eyepiece of the observation apparatus.
Figure 3:
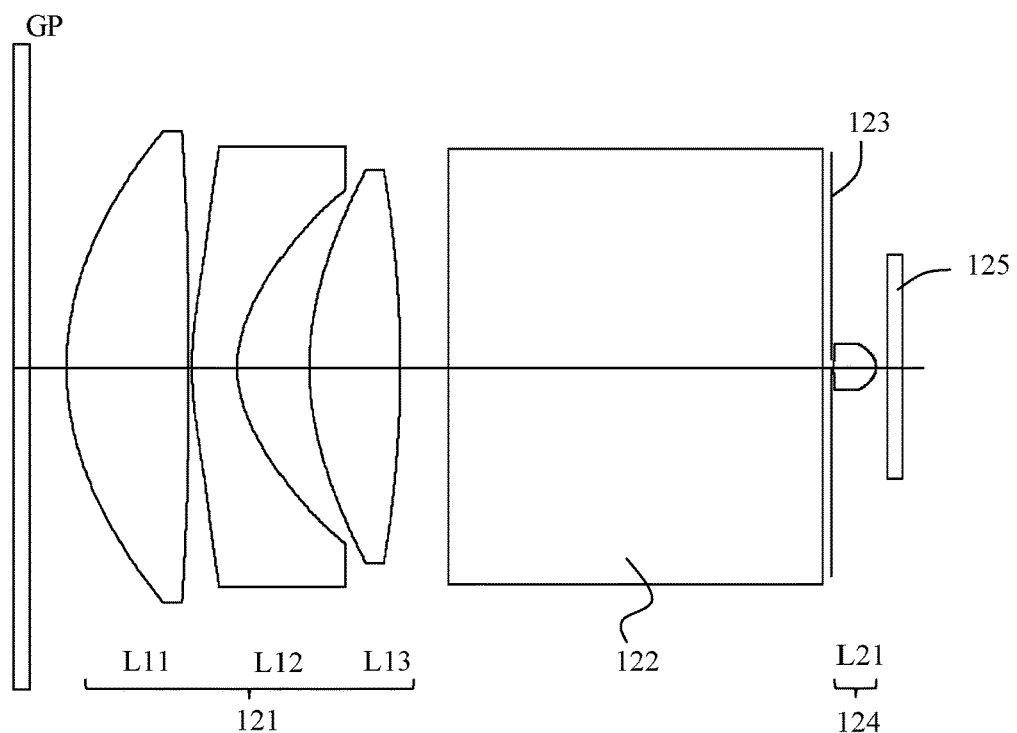
FIG. 3 is a schematic view of a line of sight detection system in the observation apparatus according to Example 1.
Figure 4:
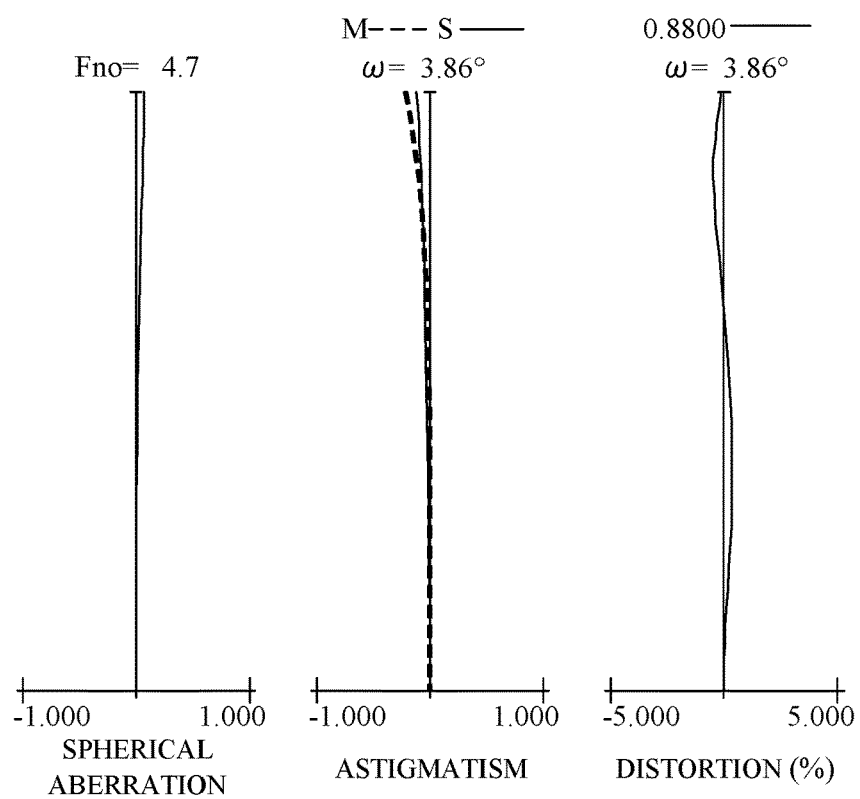
FIG. 4 is an aberration diagram at a reference position of the observation apparatus according to Example 1.
Figure 5:
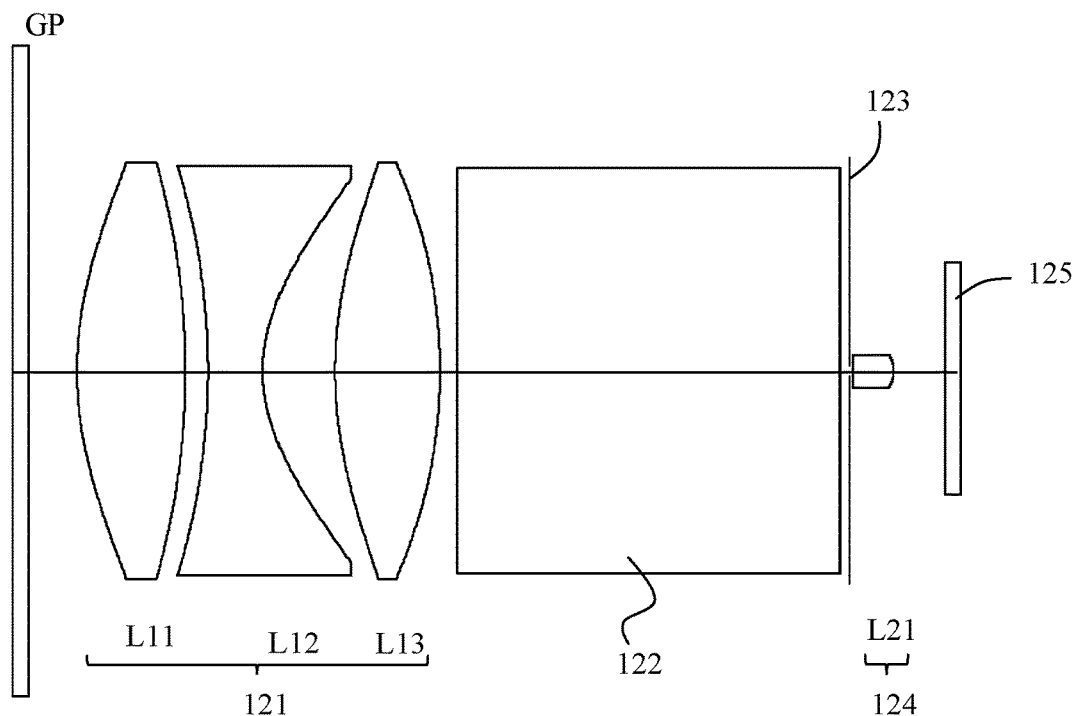
FIG. 5 is a schematic view of a line of sight detection system in an observation apparatus according to Example 2.
Figure 6:
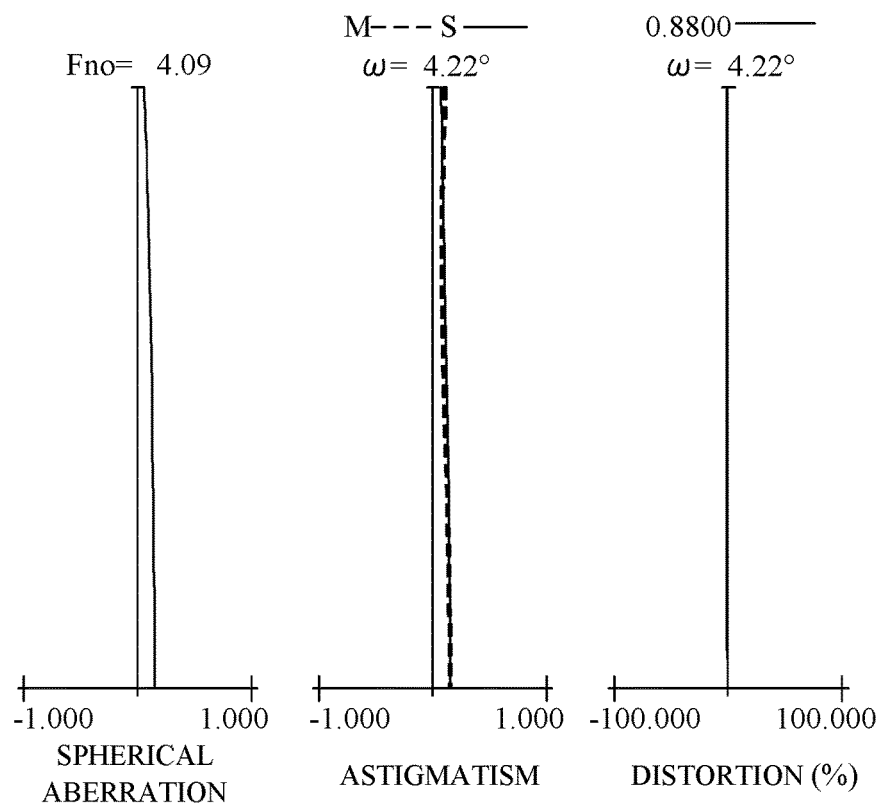
FIG. 6 is an aberration diagram at a reference position of the observation apparatus according to Example 2.
Figure 7:
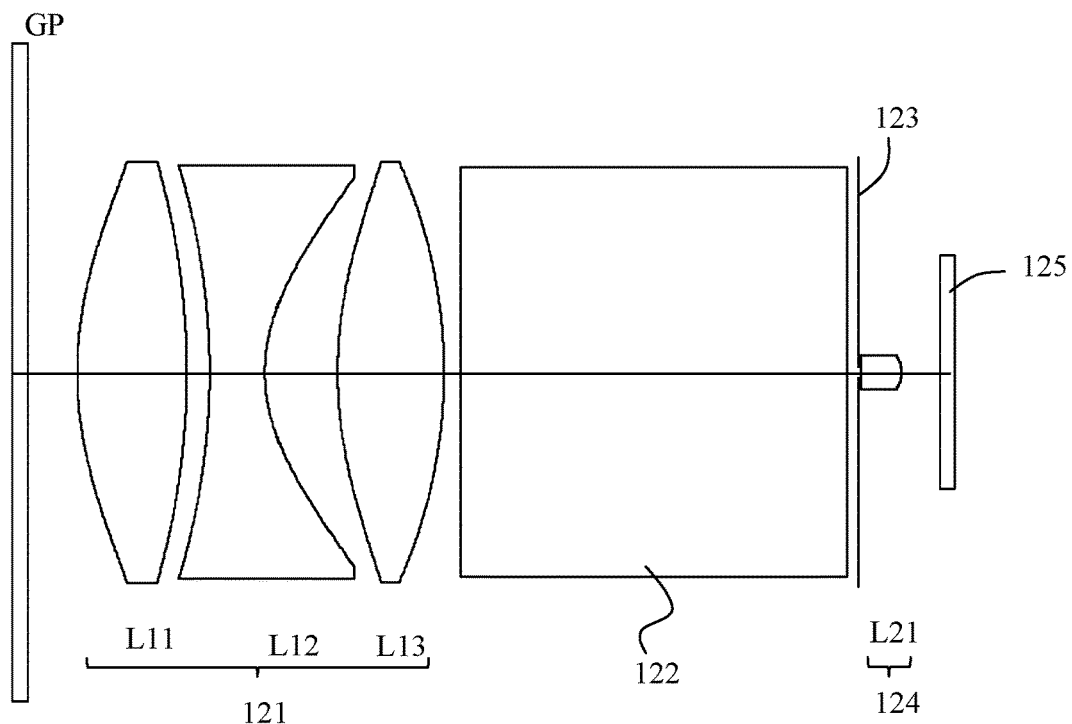
FIG. 7 is a schematic view of a line of sight detection system in an observation apparatus according to Example 3.
Figure 8:
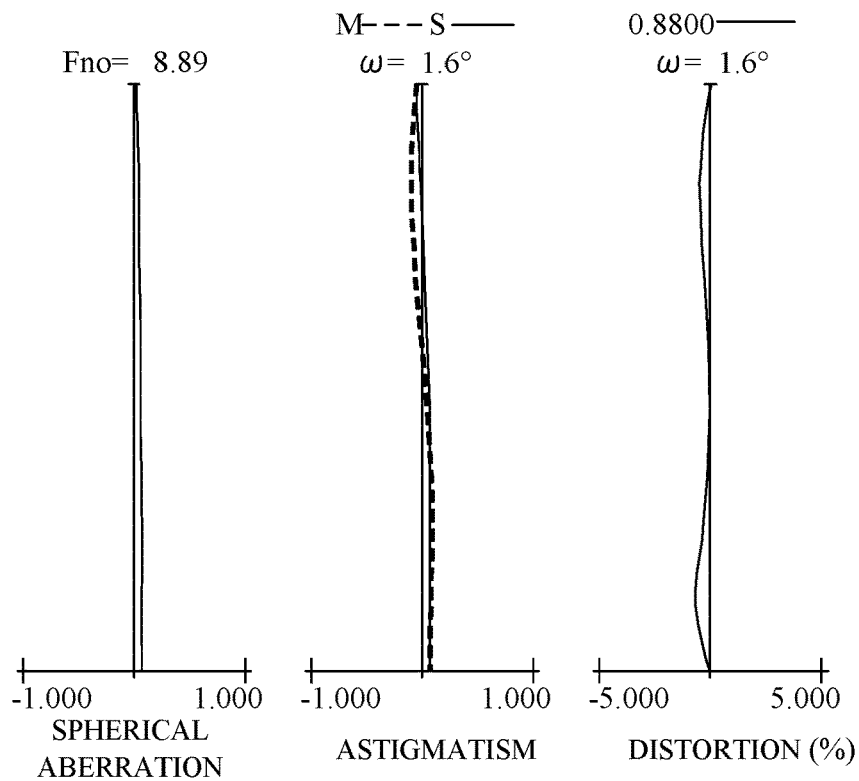
FIG. 8 is an aberration diagram at a reference position of the observation apparatus according to Example 3.
Figure 9:
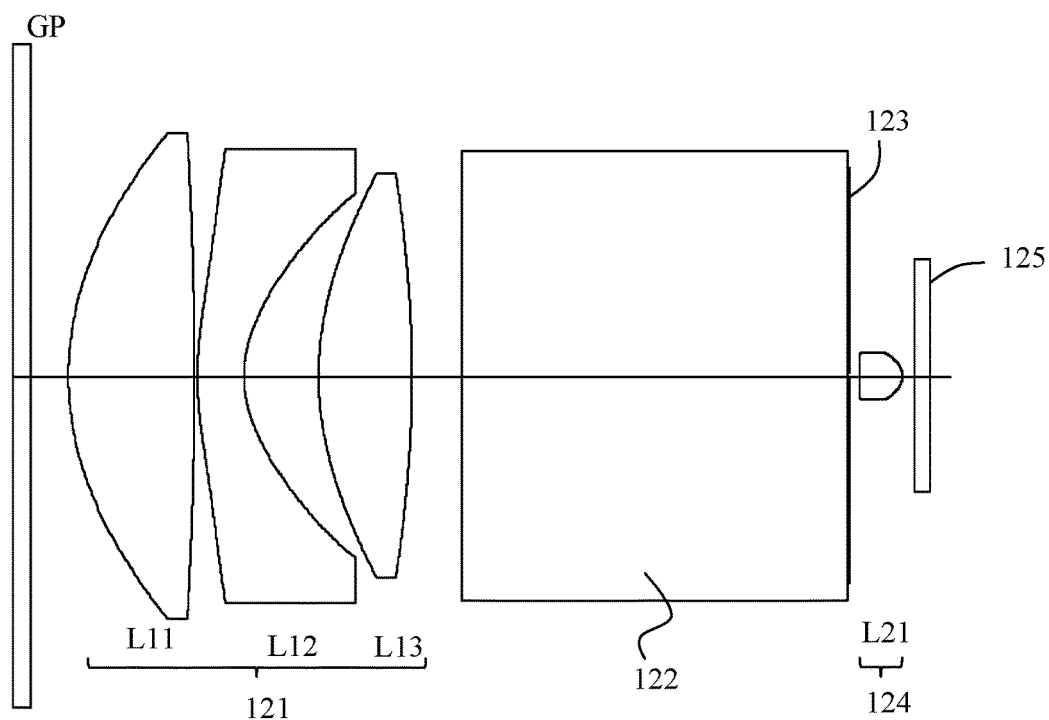
FIG. 9 is a schematic view of a line of sight detection system in an observation apparatus according to Example 4.
Figure 10:
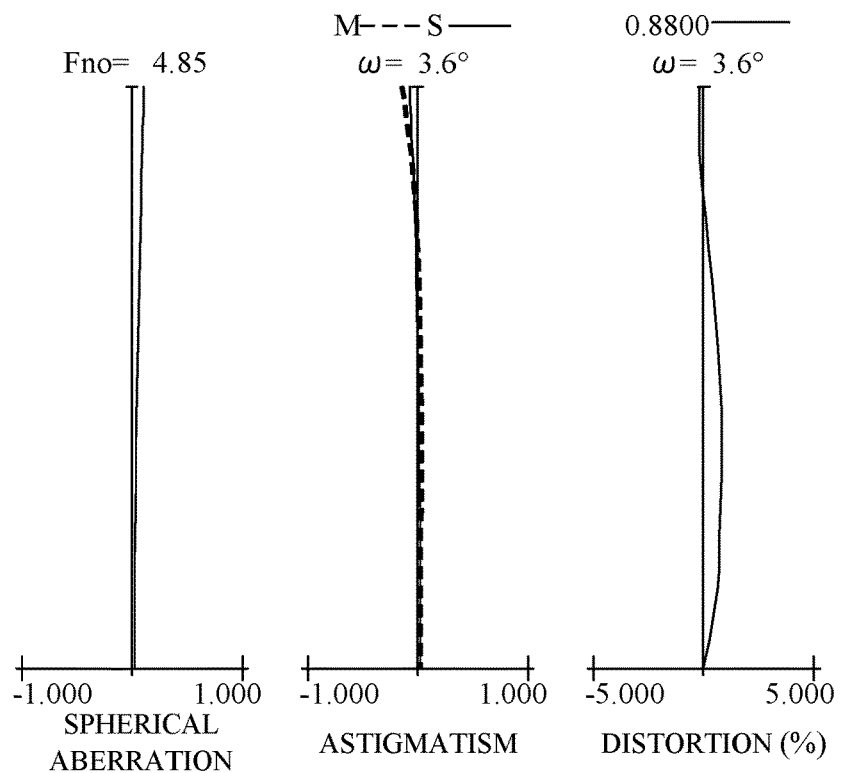
FIG. 10 is an aberration diagram at a reference position of the observation apparatus according to Example 4.
Figure 11:
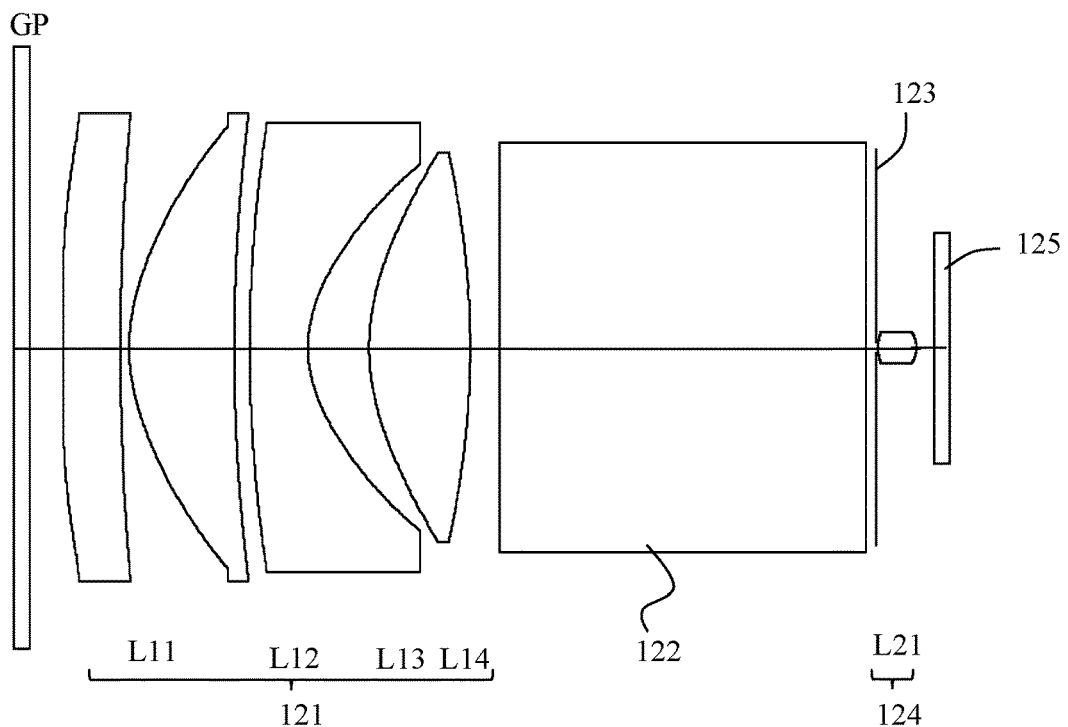
FIG. 11 is a schematic view of a line of sight detection system in an observation apparatus according to Example 5.
Figure 12:
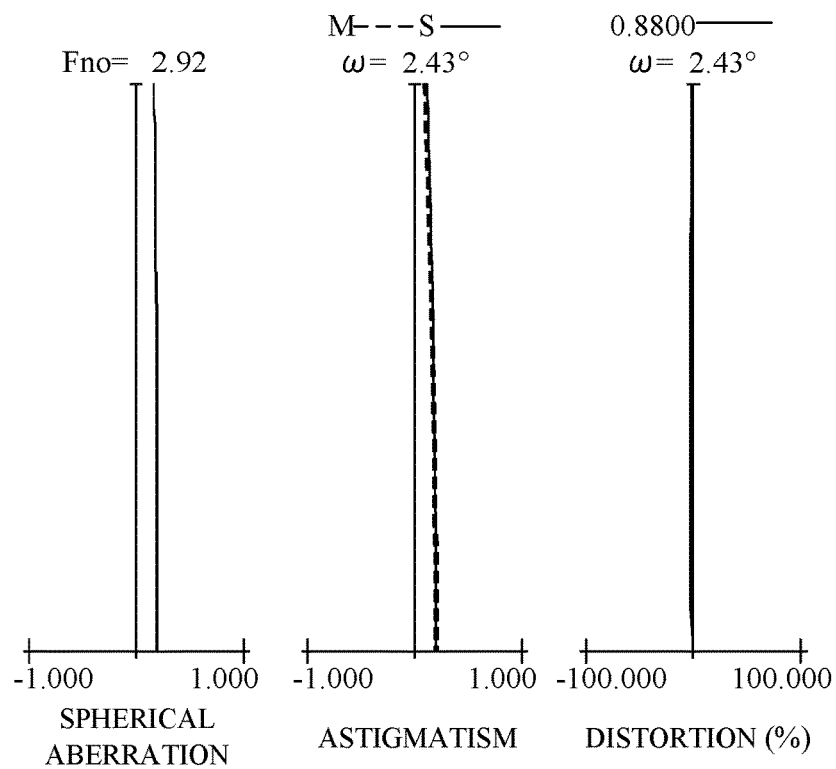
FIG. 12 is an aberration diagram at a reference position of the observation apparatus according to Example 5.
Figure 13:
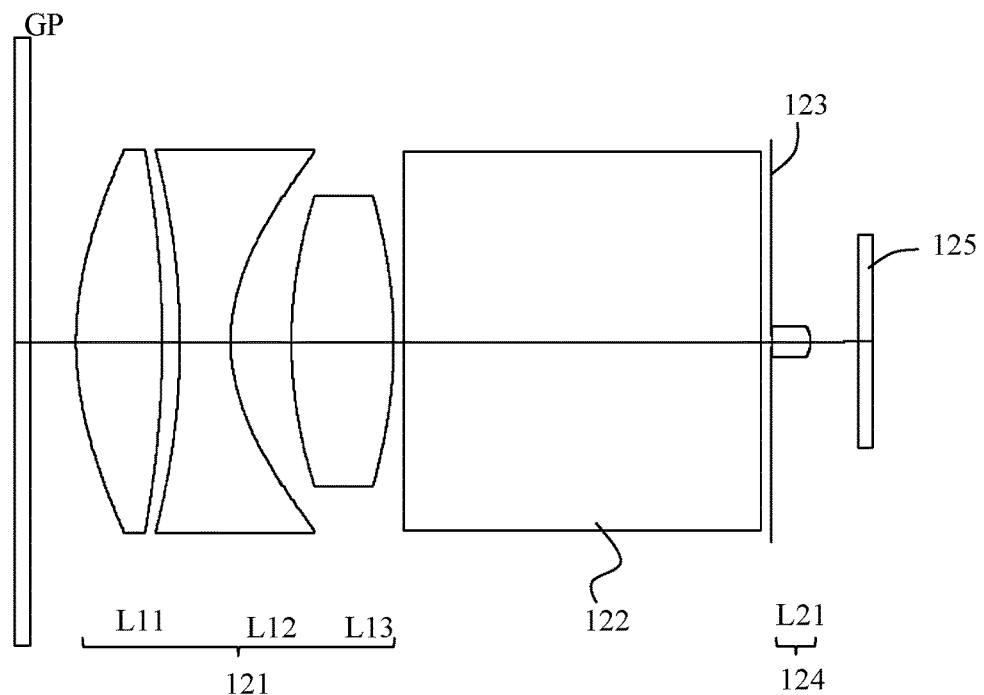
FIG. 13 is a schematic view of a line of sight detection system in an observation apparatus according to Example 6.
Figure 14:
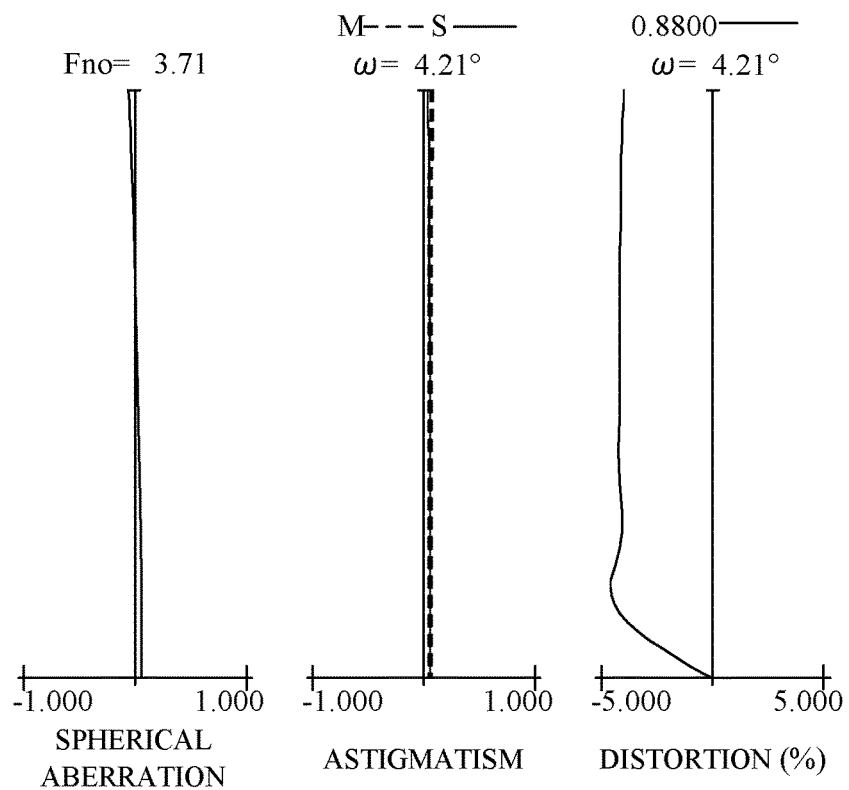
FIG. 14 is an aberration diagram at a reference position of the observation apparatus according to Example 6.
Figure 15:
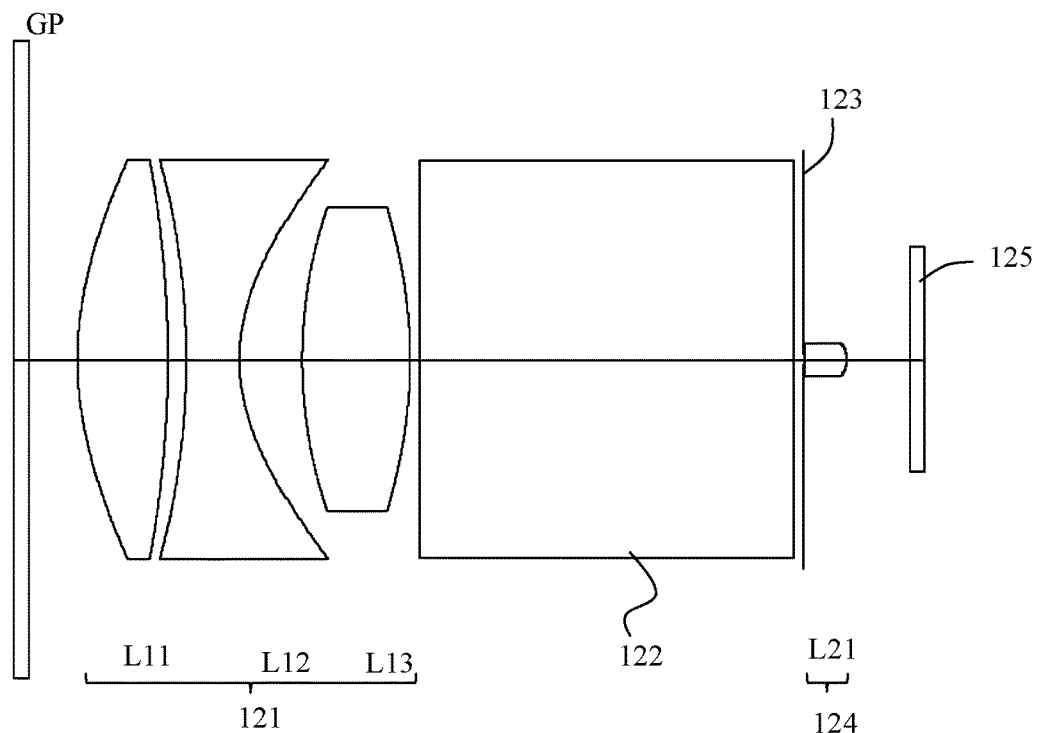
FIG. 15 is a schematic view of a line of sight detection system in an observation apparatus according to Example 7.
Figure 16:
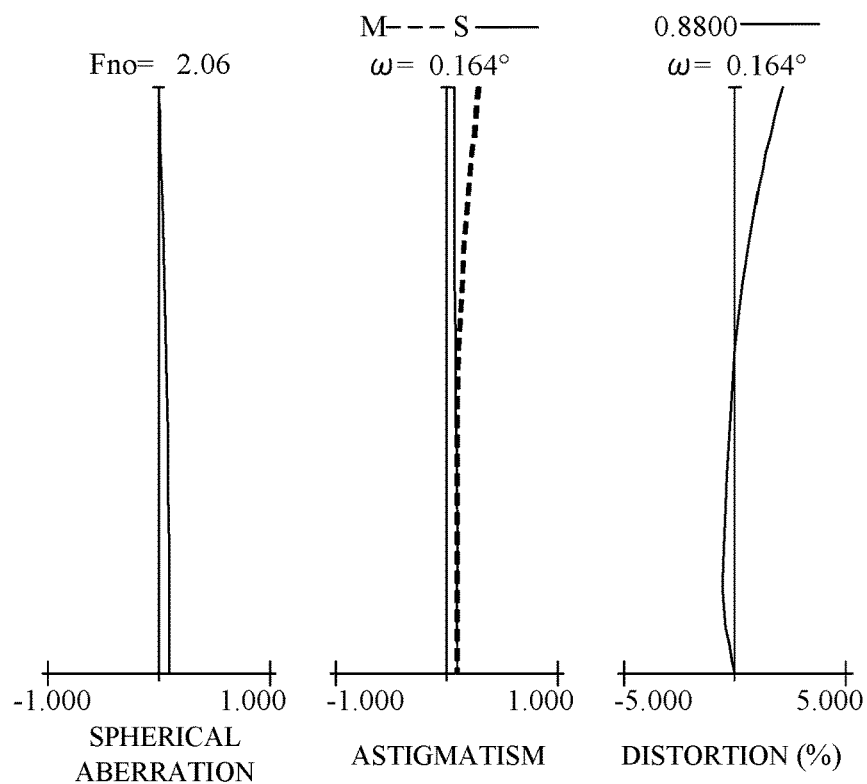
FIG. 16 is an aberration diagram at a reference position of the observation apparatus according to Example 7.
Figure 17:
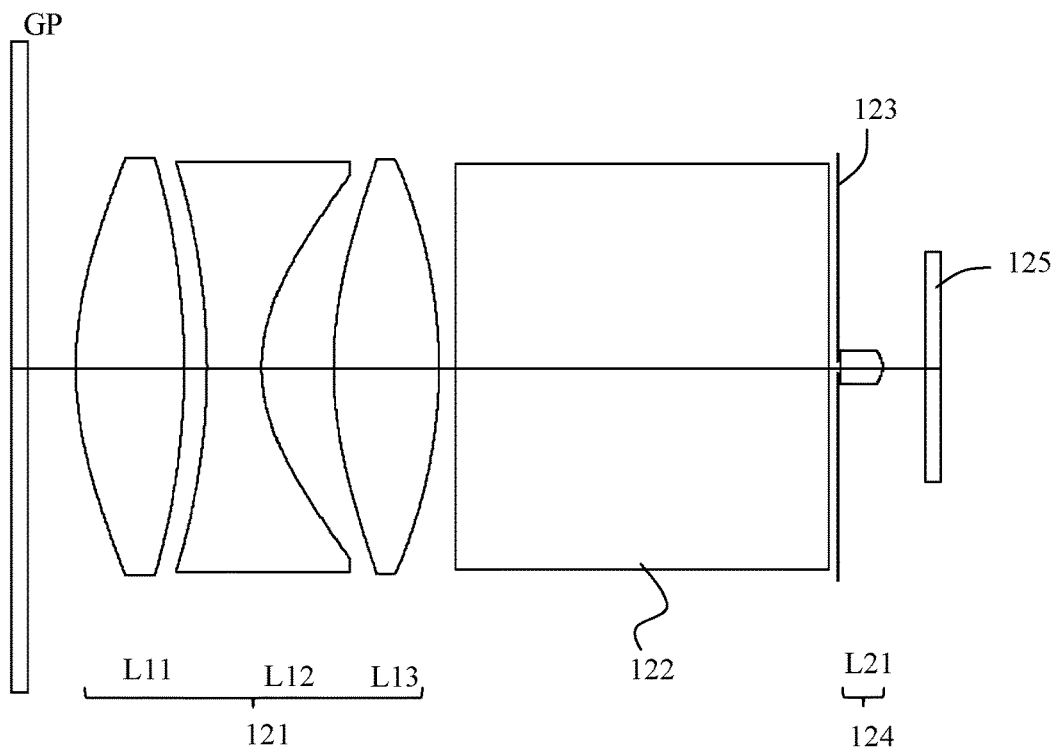
FIG. 17 is a schematic view of a line of sight detection system in an observation apparatus according to Example 8.
Figure 18:
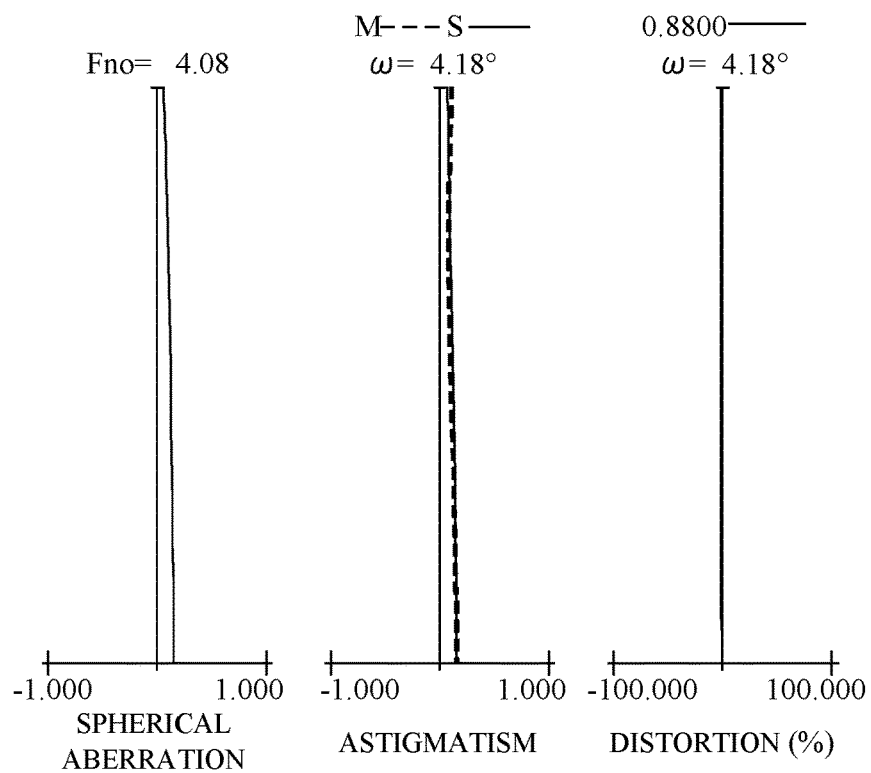
FIG. 18 is an aberration diagram at a reference position of the observation apparatus according to Example 8.
Figure 19:
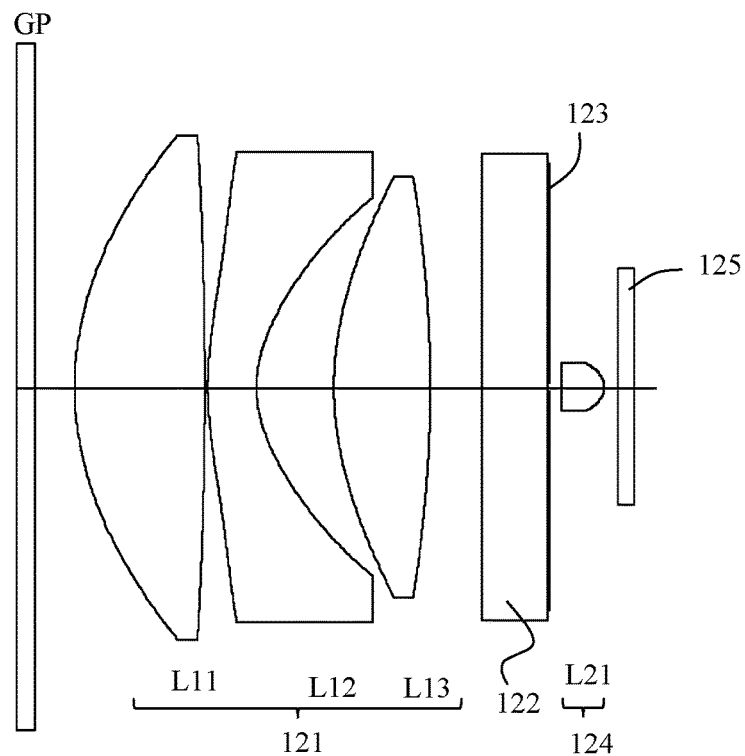
FIG. 19 is a schematic view of a line of sight detection system in an observation apparatus according to Example 9.
Figure 20:
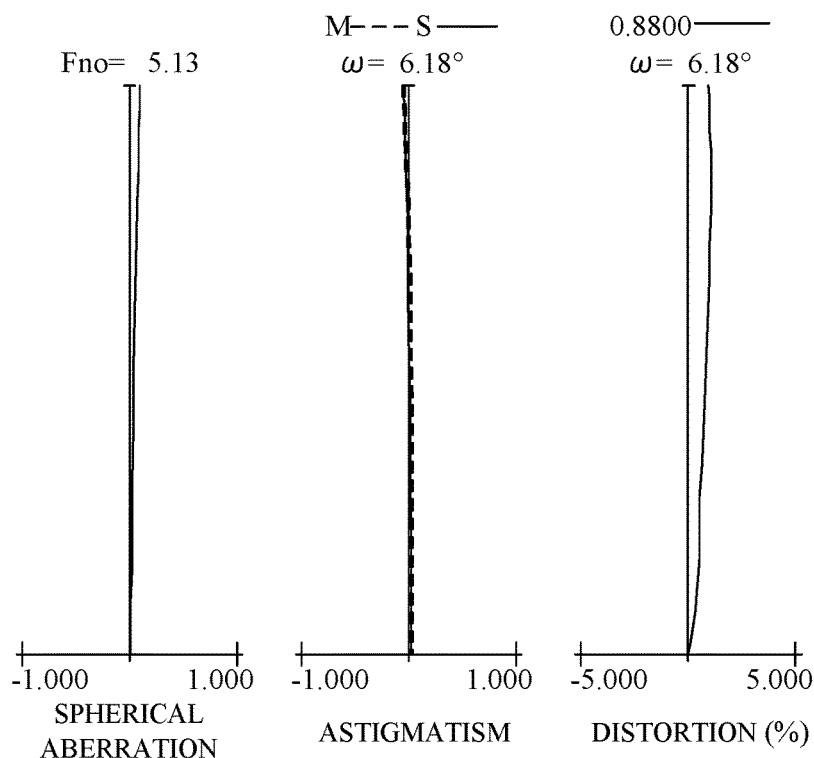
FIG. 20 is an aberration diagram at a reference position of the observation apparatus according to Example 9.
Figure 21:
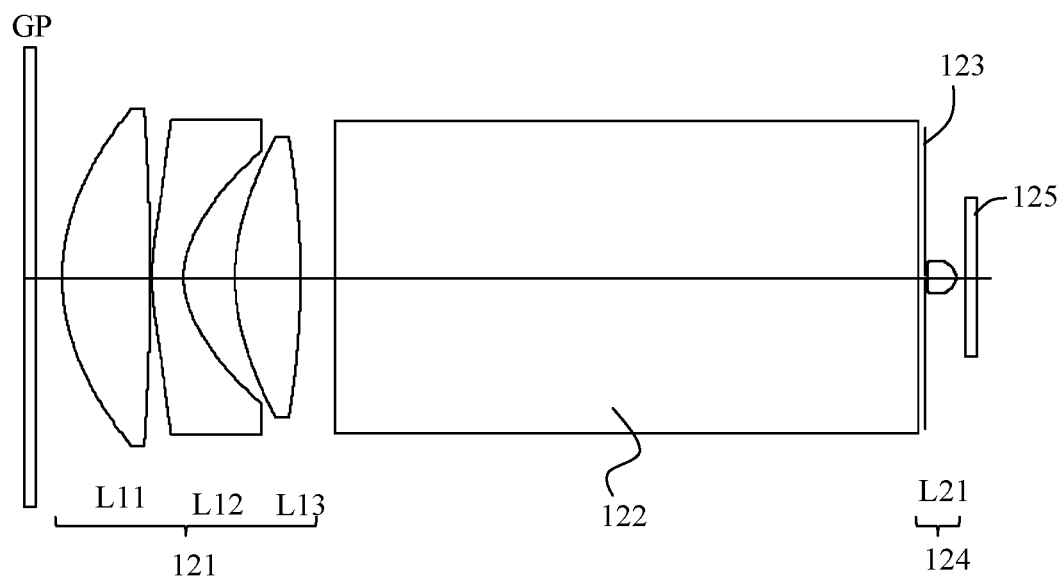
FIG. 21 is a schematic view of a line of sight detection system in an observation apparatus according to Example 10.
Figure 22:
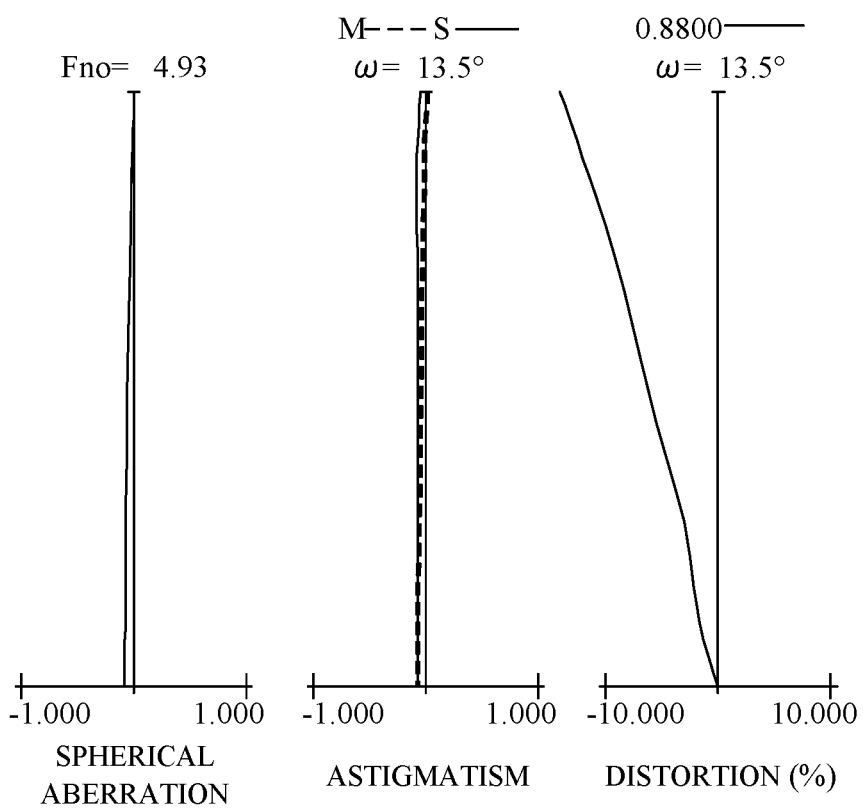
FIG. 22 is an aberration diagram at a reference position of the observation apparatus according to Example 10.
Figure 23:
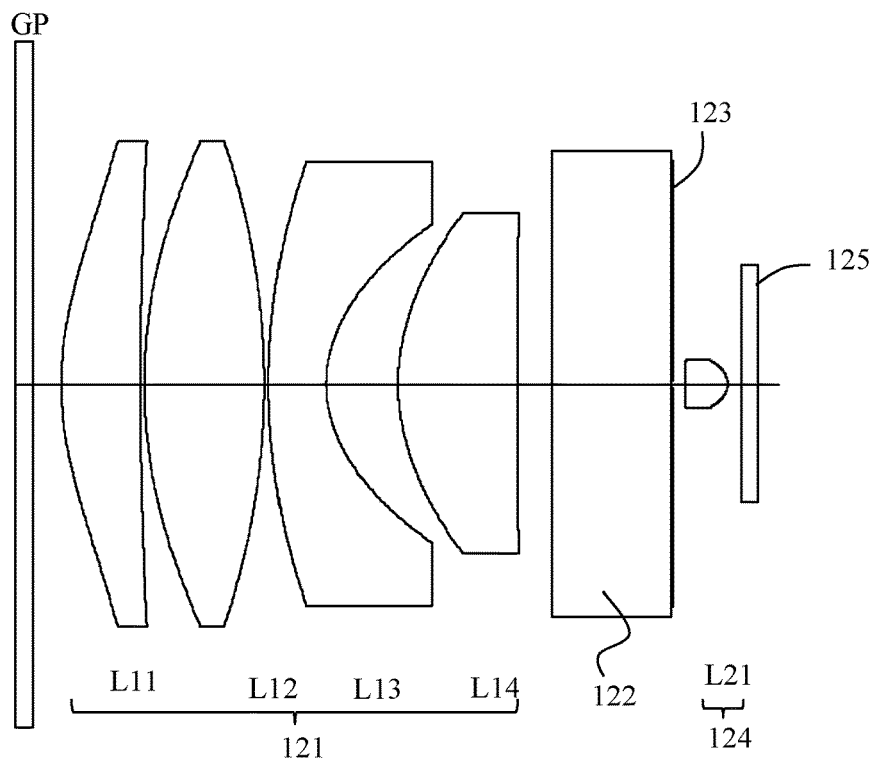
FIG. 23 is a schematic view of a line of sight detection system in an observation apparatus according to Example 11.
Figure 24:
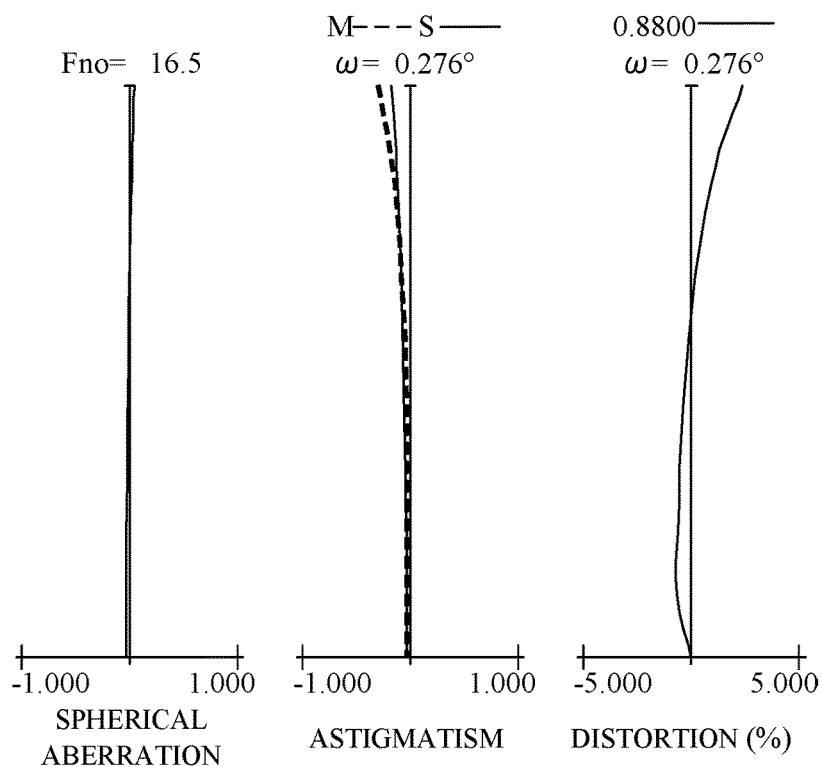
FIG. 24 is an aberration diagram at a reference position of the observation apparatus according to Example 11.

The line of sight detection system 13 includes a diaphragm 123, a second lens unit 124, and a line of sight detecting image sensor 125. The second lens unit 124 images light incident on the first lens unit 121 and split by the optical path splitter 122. More specifically, first, the infrared light emitting light sources 11 attached to an optical element GP illustrated in FIG. 2 irradiate the eyeball 2 of the light emission observer with infrared light. Then, the reflected light from the observer's cornea passes through the first lens unit 121, is reflected by the optical path splitter 122, is collected by the second lens unit 124, and is imaged on the line of sight detecting imaging element 125. The second lens unit 124 can be disposed at any position outside the optical path of the observation optical system 12, but in order to reduce the height of the image pickup apparatus, the second lens unit 124 may be placed below the image pickup apparatus without avoiding interference with other components. The line of sight detection system 13 may detect the line of sight of the observer by directly imaging the eyeball 2 of the observer.

The above configuration can properly arrange the observation optical system 12 and the line of sight detection system 13, and avoid the eyeball image from being shielded due to the observer's eyelashes and eyeball shape. In addition, it can suppress the distortion such as a perspective caused by obliquely imaging the eyeball of the observer.

The observation apparatus 1 may be used for an electronic viewfinder (EVF), a virtual reality (VR) system, a head mount display (HMD), a mixed reality (MR) system, and the like.

FIGS. 3, 5, 7, 9, 11, 13, 15, 17, 19, 21, and 23 are schematic views of the line of sight detection systems in the observation apparatuses according to Examples 1 to 11, respectively. In each figure, the left side is the observation side and the right side is the display element side.

FIGS. 4, 6, 8, 10, 12, 14, 16, 18, 20, 22, and 24 are aberration diagrams at reference positions of the observation apparatuses according to Examples 1 to 11, respectively. In each aberration diagram, the reference position is −1 diopter (referred to as dptr hereinafter), and the eye point length is 23 mm. The eye point length represents a distance on the optical axis from the surface closest to the observation position (which is a surface on the observation side of the protective glass in each embodiment) to the eye of the observer. When the eye point length is 5 mm to 35 mm, the observer's eyeball can be imaged, and the eyepoint length of 23 mm is the most suitable for imaging the observer's eyeball.

In the spherical aberration diagram, Fno represents an F-number and the spherical aberration diagram indicates a spherical aberration amount for the d-line (wavelength 587.6 nm). In the astigmatism diagram, S indicates an astigmatism amount on a sagittal image plane, and M indicates an astigmatism amount on a meridional image plane. The distortion diagram shows a distortion amount for the d-line. ω is the imaging half angle of view (°).

Next follows a description of a characteristic configuration of the observation apparatus according to each example.

The observation optical system according to each example satisfies the following inequalities (1) to (3):

$$0.4 < L/f1 < 2.0 \tag{1}$$

$$11 < \beta r < 16 \tag{2}$$

$$\beta r = 250 \text{ [mm]}/f1 \tag{3}$$

Here, L is a distance on the optical axis from a rear principal point position of the first lens unit 121 to a lens surface closest to the observation position (closest to the observation side) of the second lens unit 124. When an optical block, such as an optical path splitter 122 and a protective glass, is disposed between the position of the rear principal point of the first lens unit 121 and the lens surface closest to the observation position of the second lens unit 124, a distance on the optical axis is expressed by the air conversion length. f1 is a focal length of the first lens unit 121. βr is a loupe magnification of the first lens unit 121.

The inequality (1) defines a relationship between the distance on the optical axis from the rear principal point position of the first lens unit 121 to the lens surface closest to the observation position of the second lens unit 124, and the focal length of the first lens unit f1. If the inequality (1) is not satisfied, it becomes difficult to ensure the telecentricity on the observation side and to suppress fluctuations in magnification when the position of the observer's eyeball in the optical axis direction fluctuates.

The inequality (2) defines the loupe magnification of the first lens unit 121 represented by the inequality (3). If the value is higher than the upper limit in the inequality (2), it becomes difficult to suppress the spherical aberration, the curvature of field, and the lateral chromatic aberration of the observation optical system 12. If the value is lower than the lower limit in the inequality (2), it becomes difficult to secure a sufficient view angle and loupe magnification of the observation optical system.

The numerical range of the inequalities (1) and (2) may be set to those of the following inequalities (1a) and (2a):

$$0.55 < L/f1 < 1.93 \tag{1a}$$

$$11.5 < \beta r < 15.5 \tag{2a}$$

The numerical range of the inequalities (1) and (2) may be set to those of the following inequalities (1b) and (2b):

$$0.70 < L/f1 < 1.85 \tag{1b}$$

$$12 < \beta r < 15 \tag{2b}$$

Next follows a description of additional configurations that may be satisfied by the observation apparatus according to each example.

In the observation apparatus according to each example, when the eyeball of the observer is imaged, illuminating the eyeball with visible range light prevents the observer from visually recognizing the observation apparatus and thus the observer's eyeball may be illuminated with near-infrared range light. The reflectance of the near-infrared range light on the reflection surface of the optical path splitter 122 may be higher than that of the visible range light. For example, coating the lens surface with a dielectric film to provide it with a function of a dichroic mirror that selectively enhances the reflectance of a specific wavelength can enhance the reflectance of near-infrared range light.

The eyeball of the observer might be imaged with visible range light using external light or light emitted from the image display plane as a light source. This method needs no illumination apparatus and thus can reduce the cost, but the imaging result of the eyeball may vary due to significant changes of the illumination intensity depending on the external environment. Therefore, as described above, the eyeball of the observer may be illuminated with near-infrared range light.

The elaborated design of the observation optical system 12 and layout of the imaging lens 5 can image the observer's eyeball while satisfying the total reflection condition on the reflection surface of the optical path splitter 122. The total reflection condition may not be satisfied depending on the position of the observer's eyeball, and it is assumed that the exposure of the imaged result of the observer's eyeball significantly varies. The plurality of imaging lenses 5 having different optical paths can absorb the exposure variations of the imaging results.

Next follows a description of conditions that may be satisfied by the observation optical system according to each example. The observation optical system according to each example may satisfy one or more of the following inequalities (4) to (10). Here, f2R1 is a radius of curvature of the lens surface on the observation side of the positive lens closest to the observation position of the second lens unit 124. f2R2 is a radius of curvature of the lens surface on an imaging plane side of the line of sight detection system 13 of the positive lens disposed closest to the observation position of the second lens unit 124. Ndp1 is a refractive index of the prism included in the optical path splitter 122 for the d-line. vdp1 is an Abbe number for the d-line of the prism included in the optical path splitter 122. d is a distance on the optical axis from the lens surface closest to the observation position of the second lens unit 124 to the lens surface closest to the imaging plane of the line of sight detection system 13 of the second lens unit 124. f2 is a focal length of the second lens unit 124. f is a focal length of the observation apparatus 1 (when diopter is −1).

$$0.05 < (f2R1+f2R2)/(f2R1-f2R2) < 3.00 \quad (4)$$

$$1.45 < Ndp1 < 2.10 \quad (5)$$

$$20 < vdp1 < 60 \quad (6)$$

$$0.3 < d/f2 < 1.5 \quad (7)$$

$$4 \leq f1/f2 < 20 \quad (8)$$

$$0.01 < f1/|f| < 15.00 \quad (9)$$

$$0.002 < f2/|f| < 1.100 \quad (10)$$

The inequality (4) defines a shape factor of the second lens unit 124. If the inequality (4) is not satisfied, it becomes difficult to suppress the spherical aberration and the curvature of field of the line of sight detection system 13.

The inequality (5) defines the refractive index of the prism included in the optical path splitter 122 for the d-line. If the value is higher than the upper limit in the inequality (5), it becomes difficult to process the prism included in the optical path splitter 122 with high accuracy. If the value is lower than the lower limit in the inequality (5), it becomes difficult to secure a sufficient optical path length and to dispose the line of sight detection system 13 at a set position.

The inequality (6) defines the Abbe number for the d-line of the prism included in the optical path splitter 122. If the inequality (6) is not satisfied, it becomes difficult to suppress the lateral chromatic aberration and the chromatic aberration of the observation optical system 12.

The inequality (7) defines a relationship between the distance on the optical axis from the lens surface closest to the observation position of the second lens unit 124 to the lens surface closest to the imaging plane of the line of sight detection system 13 of the second lens unit 124, and the focal length of the second lens unit 124. If the value is higher than the upper limit in the inequality (7), it becomes difficult to properly set the magnification of the line of sight detection system 13. If the value is lower than the lower limit in the inequality (7), it becomes difficult to suppress the spherical aberration, the curvature of field, and the lateral chromatic aberration of the line of sight detection system 13.

The inequality (8) defines a relationship between the focal length of the first lens unit 121 and the focal length of the second lens unit 124. If the focal length of the first lens unit 121 becomes longer and the value is higher than the upper limit in the inequality (8), it becomes difficult to secure a sufficient view angle and loupe magnification of the observation optical system 12. If the value is lower than the lower limit in the inequality (8), the focal length of the observation optical system 12 becomes so short that it becomes difficult to suppress the lateral chromatic aberration, the spherical aberration, and the curvature of field of the observation optical system 12.

The inequality (9) defines a relationship between the focal length of the first lens unit 121 and the focal length of the observation apparatus 1. If the focal length of the first lens unit 121 becomes longer and the value is higher than the upper limit in the inequality (9), it becomes difficult to secure a sufficient view angle and loupe magnification of the observation optical system 12. If the value is lower than the lower limit in the inequality (9), the focal length of the observation optical system 12 becomes so short that it becomes difficult to suppress the lateral chromatic aberration, the spherical aberration, and the curvature of field of the observation optical system 12.

The inequality (10) defines a relationship between the focal length of the second lens unit 124 and the focal length of the observation apparatus 1. If the focal length of the second lens unit 124 becomes longer and the value is higher than the upper limit in the inequality (10), it becomes difficult to properly set the magnification of the line of sight detection system 13. If the value is lower than the lower limit in the inequality (10), the focal length of the line of sight detection system 13 becomes so short that it becomes difficult to suppress the curvature of field and the spherical aberration of the line of sight detection system 13.

The numerical range of the inequalities (4) to (10) may be set to those of the following inequalities (4a) to (10a):

$$0.1 < (f2R1+f2R2)/(f2R1-f2R2) < 2.3 \quad (4a)$$

$$1.5 < Ndp1 < 2.0 \quad (5a)$$

$$28 < vdp1 < 56 \quad (6a)$$

$$0.4 < d/f2 < 1.4 \quad (7a)$$

$$5 < f1/f2 < 16 \quad (8a)$$

$$0.03 < f1/|f| < 12.50 \quad (9a)$$

$$0.005 < f2/|f| < 1.000 \quad (10a)$$

The numerical range of the inequalities (4) to (10) may be set to those of the following inequalities (4b) to (10b):

$$0.15 < (f2R1+f2R2)/(f2R1-f2R2) < 1.60 \quad (4b)$$

$$1.6 < Ndp1 < 1.9 \quad (5b)$$

$$35 < vdp1 < 52 \quad (6b)$$

$$0.50 < d/f2 < 1.35 \quad (7b)$$

$$6 < f1/f2 < 12 \quad (8b)$$

$$0.06 < f1/|f| < 10.00 \quad (9b)$$

$$0.009 < f2/|f| < 0.990 \quad (10b)$$

Next follows a detailed description of the observation apparatus according to each example.

In the observation apparatuses according to Examples 1 to 4, 6 to 10, the first lens unit 121 includes, in order from the observation side to the display element side, a first lens L11 having a positive refractive power, a second lens L12 having a negative refractive power, and a third lens L13 having a positive refractive power. The second lens unit 124 includes a lens L21 having a positive refractive power.

In the observation apparatuses according to Examples 5 and 11, the first lens unit 121 includes, in order from the observation side to the display element side, a first lens L11 having a positive refractive power, a second lens L12 having a positive refractive power, a third lens L13 having a negative refractive power, and a fourth lens L14 having a positive refractive power. The second lens unit 124 includes a lens L21 having a positive refractive power.

Numerical examples 1 to 11 corresponding to Examples 1 to 11 will be shown below.

In surface data according to each numerical example, r represents a radius of curvature of each optical surface, and d represents an on-axial distance (distance on the optical axis) between an m-th surface and an (m+1)-th surface, where m is a surface number counted from the display element side. nd represents a refractive index of each optical element for the d-line, and vd represents an Abbe number of the optical element. The Abbe number vd of a certain material is expressed as follows:

$$vd = (Nd-1)/(NF-NC)$$

where Nd, NF, and NC are refractive indexes for the d-line (587.6 nm), the F-line (486.1 nm), the C-line (656.3 nm) in the Fraunhofer line.

A "backfocus" is a distance on the optical axis from a final lens surface (which is the closest to the image plane) to the paraxial image plane and described in terms of air equivalent length. A "lens unit" may be a single lens or a plurality of lenses.

If the optical surface is an aspherical surface, a * sign is attached to the right side of the surface number. The aspherical shape is expressed as follows:

$$x = (h^2/R)/[1+\{1-(1+k)(h/R)^2\}^{1/2}] + A4 \times h^4 + A6 \times h^6 + A8 \times h^8 + A10 \times h^{10}$$

where x is a displacement amount from the surface apex in the optical axis direction, h is a height from the optical axis in the direction orthogonal to the optical axis, R is a paraxial radius of curvature, k is a conical constant, A4, A6, A8, and A10 are aspherical coefficients of each order. In addition, "e±XX" in each aspherical coefficient means "$\times 10^{\pm XX}$."

Numerical Example 1

| UNIT: mm | | | | |
|---|---|---|---|---|
| (Line of sight detection system) Surface Data | | | | |
| Surface No. | r | d | nd | vd |
| 1 | ∞ | 0.80 | 1.51633 | 64.1 |
| 2 | ∞ | (Variable) | | |
| 3* | 13.712 | 6.00 | 1.76802 | 49.2 |
| 4 | −187.742 | 0.15 | | |
| 5* | 16.198 | 2.20 | 1.63550 | 23.9 |
| 6* | 5.523 | 3.52 | | |
| 7* | 14.293 | 4.45 | 1.76802 | 49.2 |
| 8 | −58.830 | (Variable) | | |
| 9 | ∞ | 18.25 | 1.83400 | 37.2 |
| 10 | ∞ | 0.60 | | |
| 11*(Diaphragm) | 2.498 | 2.00 | 1.49171 | 57.4 |
| 12* | −0.825 | 1.06 | | |
| Image Plane | ∞ | | | |
| (Observation optical system) Surface Data | | | | |
| Surface No. | r | d | nd | vd |
| 1 | ∞ | 0.80 | 1.51633 | 64.1 |
| 2 | ∞ | (Variable) | | |
| 3* | 13.712 | 6.00 | 1.76802 | 49.2 |

-continued

| UNIT: mm | | | | |
|---|---|---|---|---|
| 4 | −187.742 | 0.15 | | |
| 5* | 16.198 | 2.20 | 1.63550 | 23.9 |
| 6* | 5.523 | 3.52 | | |
| 7* | 14.293 | 4.45 | 1.76802 | 49.2 |
| 8 | −58.830 | (Variable) | | |
| 9 | ∞ | 7.50 | 1.83400 | 37.2 |
| 10 | ∞ | 2.40 | | |
| 11 | ∞ | 0.70 | 1.52100 | 65.1 |
| Display panel plane | ∞ | | | |

ASPHERIC DATA

3rd Surface

K = −1.83270e+000 A 4 = 1.51941e−005 A 6 = 4.23288e−007 A 8 = −3.98958e−009 A10 = 1.14377e−011

5th Surface

K = −7.67553e+000 A 4 = −2.88147e−004 A 6 = 3.08918e−006 A 8 = −1.32371e−008 A10 = 1.78749e−011

6th Surface

K = −1.89824e+000 A 4 = −4.01320e−005 A 6 = 1.65020e−006 A 8 = 8.03262e−009 A10 = −8.75967e−011

7th Surface

K = −7.01803e−001 A 4 = −8.40229e−005 A 6 = 6.12255e−007 A 8 = −7.74356e−009 A10 = 4.18240e−011

11th Surface

K = 4.15727e+000 A 4 = −9.50353e−001 A 6 = 1.93448e+000 A 8 = −1.86456e+000 A10 = 6.25846e−001

12th Surface

K = −1.29048e+000 A 4 = −6.72136e−002 A 6 = −8.51031e−002 A 8 = 3.20341e−002 A10 = −1.55152e−002

VARIOUS DATA

| Focal Length: | −10.03 (when diopter is −1) | | |
|---|---|---|---|
| FNO | 4.62 | | |
| Half Angle of View:(°) | 3.86 | | |
| BF | 1.06 | | |

| | 0dptr | −1dptr | +2dptr |
|---|---|---|---|
| d 2 | 1.45 | 1.80 | 0.62 |
| d 8 | 2.72 | 2.36 | 3.55 |

Lens Unit Data

| Lens Unit | Starting Surface | Focal Length: |
|---|---|---|
| 1 | 3 | 18.70 |
| 2 | 11 | 1.57 |

Numerical Example 2

| UNIT: mm | | | | |
|---|---|---|---|---|
| (Line of sight detection system) Surface Data | | | | |
| Surface No. | r | d | nd | vd |
| 1 | ∞ | 0.80 | 1.51633 | 64.1 |
| 2 | ∞ | (Variable) | | |
| 3* | 16.724 | 5.27 | 1.85135 | 40.1 |
| 4 | −36.577 | 1.12 | | |
| 5 | −33.437 | 2.65 | 1.63550 | 23.9 |
| 6* | 7.971 | 3.47 | | |
| 7* | 19.285 | 5.11 | 1.85135 | 40.1 |
| 8 | −24.766 | (Variable) | | |

-continued

| | | UNIT: mm | | |
|---|---|---|---|---|
| 9 | ∞ | 18.56 | 1.65844 | 50.9 |
| 10 | ∞ | 0.60 | | |
| 11 (Diaphragm) | 29.478 | 2.00 | 1.58306 | 30.2 |
| 12* | −1.441 | 2.16 | | |
| Image Plane | ∞ | | | |

(Observation optical system)
Surface Data

| Surface No. | r | d | nd | vd |
|---|---|---|---|---|
| 1 | ∞ | 0.80 | 1.51633 | 64.1 |
| 2 | ∞ | (Variable) | | |
| 3* | 16.724 | 5.27 | 1.85135 | 40.1 |
| 4 | −36.577 | 1.12 | | |
| 5 | −33.437 | 2.65 | 1.63550 | 23.9 |
| 6* | 7.971 | 3.47 | | |
| 7* | 19.285 | 5.11 | 1.85135 | 40.1 |
| 8 | −24.766 | (Variable) | | |
| 9 | ∞ | 15.00 | 1.65844 | 50.9 |
| 10 | ∞ | 0.76 | | |
| Display panel plane | ∞ | | | |

ASPHERIC DATA

3rd Surface

K = 0.00000e+000 A 4 = −8.37321e−005 A 6 = −4.91699e−008

6th Surface

K = −7.14300e−001 A 4 = −2.40436e−004

7th Surface

K = 0.00000e+000 A 4 = −6.65184e−005

12th Surface

K = −9.58889e−001 A 4 = −7.99335e−002 A 6 = 2.40004e−001 A 8 = −2.58203e−001

VARIOUS DATA

| Focal Length: | 7.49 (when diopter is −1) |
|---|---|
| FNO | 4.09 |
| Half Angle of View:(°) | 4.22 |
| BF | 2.16 |

| | 0dptr | −1dptr | +2dptr |
|---|---|---|---|
| d 2 | 1.16 | 1.58 | 0.80 |
| d 8 | 1.98 | 1.56 | 2.33 |

Lens Unit Data

| Lens Unit | Starting Surface | Focal Length: |
|---|---|---|
| 1 | 3 | 19.28 |
| 2 | 11 | 2.41 |

Numerical Example 3

| | UNIT:mm | | | |
|---|---|---|---|---|
| (Line of sight detection system) Surface Data | | | | |
| Surface No. | r | d | nd | vd |
| 1 | ∞ | 0.80 | 1.51633 | 64.1 |
| 2 | ∞ | (Variable) | | |
| 3* | 16.724 | 5.27 | 1.85135 | 40.1 |
| 4 | −36.577 | 1.12 | | |
| 5 | −33.437 | 2.65 | 1.63550 | 23.9 |
| 6* | 7.971 | 3.47 | | |
| 7* | 19.285 | 5.11 | 1.85135 | 40.1 |

-continued

| UNIT:mm | | | | |
|---|---|---|---|---|
| 8 | −24.766 | (Variable) | | |
| 9 | ∞ | 18.56 | 1.65844 | 50.9 |
| 10 | ∞ | 0.60 | | |
| 11 (Diaphragm) | 9.803 | 2.00 | 1.58306 | 30.2 |
| 12* | −1.331 | 1.79 | | |
| Image Plane | ∞ | | | |

| (Observation optical system) Surface Data | | | | |
|---|---|---|---|---|
| Surface No. | r | d | nd | vd |
| 1 | ∞ | 0.80 | 1.51633 | 64.1 |
| 2 | ∞ | (Variable) | | |
| 3* | 16.724 | 5.27 | 1.85135 | 40.1 |
| 4 | −36.577 | 1.12 | | |
| 5 | −33.437 | 2.65 | 1.63550 | 23.9 |
| 6* | 7.971 | 3.47 | | |
| 7* | 19.285 | 5.11 | 1.85135 | 40.1 |
| 8 | −24.766 | (Variable) | | |
| 9 | ∞ | 12.00 | 1.65844 | 50.9 |
| 10 | ∞ | 2.22 | | |
| Display panel plane | ∞ | | | |

ASPHERIC DATA

3rd Surface $K = 0.00000e+000$  $A\,4 = -8.37321e-005$  $A\,6 = -4.91699e-008$

6th Surface $K = -7.14300e-001$  $A\,4 = -2.40436e-004$

7th Surface $K = 0.00000e+000$  $A\,4 = -6.65184e-005$

12th Surface $K = -1.55871e+001$  $A\,4 = -6.60841e-001$  $A\,6 = 9.71729e-001$  $A\,8 = -5.71702e-001$

VARIOUS DATA

| Focal Length: | −43.99 (when diopter is −1) |
|---|---|
| FNO | 8.89 |
| Half Angle of View:(°) | 1.60 |
| BF | 1.79 |

| | 0dptr | −1dptr | +2dptr |
|---|---|---|---|
| d 2 | 1.16 | 1.58 | 0.80 |
| d 8 | 1.98 | 1.56 | 2.33 |

Zoom Lens Unit Data

| Lens Unit | Starting Surface | Focal Length: |
|---|---|---|
| 1 | 3 | 19.28 |
| 2 | 11 | 2.15 |

Numerical Example 4

| UNIT:mm | | | | |
|---|---|---|---|---|
| (Line of sight detection system) Surface Data | | | | |
| Surface No. | r | d | nd | vd |
| 1 | ∞ | 0.83 | 1.51633 | 64.1 |
| 2 | ∞ | (Variable) | | |
| 3* | 14.261 | 6.24 | 1.76802 | 49.2 |
| 4 | −195.251 | 0.16 | | |
| 5* | 16.845 | 2.29 | 1.63550 | 23.9 |
| 6* | 5.744 | 3.66 | | |

-continued

| UNIT:mm | | | | |
|---|---|---|---|---|
| 7* | 14.864 | 4.63 | 1.76802 | 49.2 |
| 8 | −61.184 | (Variable) | | |
| 9 | ∞ | 18.99 | 1.83400 | 37.2 |
| 10 | ∞ | 0.62 | | |
| 11*(Diaphragm) | 2.598 | 2.08 | 1.49171 | 57.4 |
| 12* | −0.880 | 0.62 | | |
| 13 | ∞ | 0.78 | 1.55300 | 38.0 |
| 14 | ∞ | 1.13 | | |
| Image Plane | ∞ | | | |

(Observation optical system)
Surface Data

| Surface No. | r | d | nd | vd |
|---|---|---|---|---|
| 1 | ∞ | 0.83 | 1.51633 | 64.1 |
| 2 | ∞ | (Variable) | | |
| 3* | 14.261 | 6.24 | 1.76802 | 49.2 |
| 4 | −195.251 | 0.16 | | |
| 5* | 16.845 | 2.29 | 1.63550 | 23.9 |
| 6* | 5.744 | 3.66 | | |
| 7* | 14.864 | 4.63 | 1.76802 | 49.2 |
| 8 | −61.184 | (Variable) | | |
| 9 | ∞ | 10.00 | 1.83400 | 37.2 |
| 10 | ∞ | 1.78 | | |
| Display panel plane | ∞ | | | |

ASPHERIC DATA

3rd Surface

K = −1.83270e+000 A4 = 1.35075e−005 A 6 = 3.47912e−007 A 8 = −3.03175e−009
A10 = 8.03597e−012

5th Surface

K = −7.67553e+000 A 4 = −2.56161e−004 A 6 = 2.53908e−006 A 8 = −1.00591e−008
A10 = 1.25586e−011

6th Surface

K = −1.89824e+000 A 4 = −3.56772e−005 A 6 = 1.35635e−006 A 8 = 6.10413e−009
A10 = −6.15443e−011

7th Surface

K = −7.01803e−001 A 4 = −7.46960e−005 A 6 = 5.03229e−007 A 8 = −5.88447e−009
A10 = 2.93850e−011

11th Surface

K = 4.15727e+000 A 4 = −8.44860e−001 A 6 = 1.59000e+000 A 8 = −1.41692e+000
A10 = 4.39711e−001

12th Surface

K = −1.29048e+000 A 4 = −5.97527e−002 A 6 = −6.99486e−002 A 8 = 2.43433e−002
A10 = −1.09008e−002

VARIOUS DATA

| Focal Length: | −10.75 (when diopter is −1) | | | |
|---|---|---|---|---|
| FNO | 4.85 | | | |
| Half Angle of View:(°) | 3.60 | | | |
| BF | 1.13 | | | |

| | 0dptr | −1dptr | +2dptr | −4dptr |
|---|---|---|---|---|
| d2 | 1.51 | 1.87 | 0.64 | 3.22 |
| d8 | 2.82 | 2.46 | 3.69 | 1.11 |

Zoom Lens Unit Data

| Lens Unit | Starting Surface | Focal Length: |
|---|---|---|
| 1 | 3 | 19.45 |
| 2 | 11 | 1.67 |

Numerical Example 5

UNIT: mm

Surface Data

| Surface No. | r | d | nd | vd |
|---|---|---|---|---|
| (Line of sight detection system) | | | | |
| 1 | ∞ | 0.80 | 1.51633 | 64.1 |
| 2 | ∞ | (Variable) | | |
| 3* | −202.682 | 3.00 | 1.76802 | 49.2 |
| 4 | 128.381 | 0.50 | | |
| 5* | 10.149 | 5.49 | 1.76802 | 49.2 |
| 6 | 100.513 | 0.81 | | |
| 7 | 77.355 | 3.00 | 1.63550 | 23.9 |
| 8* | 6.247 | 3.18 | | |
| 9* | 11.214 | 5.33 | 1.76802 | 49.2 |
| 10 | −45.774 | (Variable) | | |
| 11 | ∞ | 19.14 | 1.65844 | 50.9 |
| 12 | ∞ | 0.60 | | |
| 13(Diaphragm) | 2.212 | 2.00 | 1.58306 | 30.2 |
| 14* | −1.410 | 1.10 | | |
| Image Plane | ∞ | | | |
| (Observation optical system) | | | | |
| 1 | ∞ | 0.80 | 1.51633 | 64.1 |
| 2 | ∞ | (Variable) | | |
| 3* | −202.682 | 3.00 | 1.76802 | 49.2 |
| 4 | 128.381 | 0.50 | | |
| 5* | 10.149 | 5.49 | 1.76802 | 49.2 |
| 6 | 100.513 | 0.81 | | |
| 7 | 77.355 | 3.00 | 1.63550 | 23.9 |
| 8* | 6.247 | 3.18 | | |
| 9* | 11.214 | 5.33 | 1.76802 | 49.2 |
| 10 | −45.774 | (Variable) | | |
| 11 | ∞ | 10.00 | 1.65844 | 50.9 |
| 12 | ∞ | 1.92 | | |
| Display panel plane | ∞ | | | |

ASPHERIC DATA

3rd Surface $K = 0.00000e+000$ $A4 = 2.00393e-004$ $A6 = -2.32790e-006$
$A8 = 1.55572e-008$ $A10 = -4.40310e-011$ 5th Surface $K = -9.72705e-001$ $A4 = -2.12458e-004$ $A6 = 1.84920e-006$
$A8 = -9.08050e-009$ $A10 = 1.93848e-011$ 8th Surface $K = -6.95456e-001$ $A4 = -5.91390e-004$ $A6 = 4.13474e-006$
$A8 = -2.54986e-008$ $A10 = -5.81970e-012$ 9th Surface $K = -1.51121e-001$ $A4 = -2.37140e-004$ $A6 = 7.84258e-007$
$A8 = -3.54325e-009$ $A10 = -1.94097e-011$ 14th Surface $K = -9.37044e-001$ $A4 = -1.73405e-002$ $A6 = 2.56245e-002$
$A8 = 4.36260e-002$

VARIOUS DATA

| | | | |
|---|---|---|---|
| Focal Length: | 10.20 (when diopter is −1) | | |
| FNO | 2.92 | | |
| Half Angle of View: (°) | 2.43 | | |
| BF | 1.10 | | |

| | 0 dptr | −1 dptr | +2 dptr |
|---|---|---|---|
| d 2 | 2.11 | 1.77 | 0.50 |
| d10 | 1.20 | 1.54 | 2.81 |

Zoom Lens Unit Data

| Lens Unit | Starting Surface | Focal Length: |
|---|---|---|
| 1 | 3 | 18.72 |
| 2 | 13 | 1.85 |

Numerical Example 6

UNIT: mm

Surface Data

| Surface No. | r | d | nd | vd |
|---|---|---|---|---|
| (Line of sight detection system) | | | | |
| 1 | ∞ | 0.80 | 1.51633 | 64.1 |
| 2 | ∞ | (Variable) | | |
| 3* | 16.933 | 4.49 | 1.85135 | 40.1 |
| 4 | −53.991 | 0.93 | | |
| 5 | −38.052 | 2.64 | 1.63550 | 23.9 |
| 6* | 9.289 | 3.11 | | |
| 7 | 23.348 | 5.33 | 1.85135 | 40.1 |
| 8* | −23.350 | (Variable) | | |
| 9 | ∞ | 18.56 | 1.65844 | 50.9 |
| 10 | ∞ | 0.60 | | |
| 11(Diaphragm) | −15.000 | 2.00 | 1.58306 | 30.2 |
| 12* | −1.399 | 2.46 | | |
| Image Plane | ∞ | | | |
| (Observation optical system) | | | | |
| 1 | ∞ | 0.80 | 1.51633 | 64.1 |
| 2 | ∞ | (Variable) | | |
| 3* | 16.933 | 4.49 | 1.85135 | 40.1 |
| 4 | −53.991 | 0.93 | | |
| 5 | −38.052 | 2.64 | 1.63550 | 23.9 |
| 6* | 9.289 | 3.11 | | |
| 7 | 23.348 | 5.33 | 1.85135 | 40.1 |
| 8* | −23.350 | (Variable) | | |
| 9 | ∞ | 15.00 | 1.65844 | 50.9 |
| 10 | ∞ | 2.23 | | |
| Display panel plane | ∞ | | | |

ASPHERIC DATA

3rd Surface $K = 0.00000e+000$ $A4 = -7.01307e-005$

6th Surface $K = -6.58187e-001$ $A4 = -1.54027e-004$

8th Surface $K = 0.00000e+000$ $A4 = 4.39388e-005$

12th Surface $K = 0.00000e+000$ $A4 = 9.64550e-003$ $A6 = 1.23319e-001$
$A8 = -1.61973e-001$

VARIOUS DATA

| | | | |
|---|---|---|---|
| Focal Length: | 6.12 (when diopter is −1) | | |
| FNO | 3.71 | | |
| Half Angle of View:(°) | 4.21 | | |
| BF | 2.46 | | |

| | 0 dptr | −1 dptr | +2 dptr |
|---|---|---|---|
| d 2 | 1.18 | 1.61 | 0.80 |
| d 8 | 1.67 | 1.24 | 2.05 |

-continued

UNIT: mm

Zoom Lens Unit Data

| Lens Unit | Starting Surface | Focal Length: |
|---|---|---|
| 1 | 3 | 19.63 |
| 2 | 11 | 2.51 |

-continued

UNIT: mm

Lens Unit Data

| Lens Unit | Starting Surface | Focal Length: |
|---|---|---|
| 1 | 3 | 19.63 |
| 2 | 11 | 3.12 |

Numerical Example 7

UNIT: mm

Surface Data

| Surface No. | r | d | nd | vd |
|---|---|---|---|---|
| (Line of sight detection system) | | | | |
| 1 | ∞ | 0.80 | 1.51633 | 64.1 |
| 2 | ∞ | (Variable) | | |
| 3* | 16.933 | 4.49 | 1.85135 | 40.1 |
| 4 | −53.991 | 0.93 | | |
| 5 | −38.052 | 2.64 | 1.63550 | 23.9 |
| 6* | 9.289 | 3.11 | | |
| 7 | 23.348 | 5.33 | 1.85135 | 40.1 |
| 8* | −23.350 | (Variable) | | |
| 9 | ∞ | 18.56 | 1.65844 | 50.9 |
| 10 | ∞ | 0.60 | | |
| 11(Diaphragm) | −7.117 | 2.00 | 1.58306 | 30.2 |
| 12* | −1.598 | 3.11 | | |
| Image Plane | ∞ | | | |
| (Observation optical system) | | | | |
| 1 | ∞ | 0.80 | 1.51633 | 64.1 |
| 2 | ∞ | (Variable) | | |
| 3* | 16.933 | 4.49 | 1.85135 | 40.1 |
| 4 | −53.991 | 0.93 | | |
| 5 | −38.052 | 2.64 | 1.63550 | 23.9 |
| 6* | 9.289 | 3.11 | | |
| 7 | 23.348 | 5.33 | 1.85135 | 40.1 |
| 8* | −23.350 | (Variable) | | |
| 9 | ∞ | 15.00 | 1.65844 | 50.9 |
| 10 | ∞ | 2.23 | | |
| Display panel plane | ∞ | | | |

ASPHERIC DATA

3rd Surface

K = 0.00000e+000 A 4 = −7.01307e−005

6th Surface

K = −6.58187e−001 A 4 = −1.54027e−004

8th Surface

K = 0.00000e+000 A 4 = 4.39388e−005

12th Surface

K = 0.00000e+000 A 4 = 3.13994e−003 A 6 = 7.65736e−002 A 8 = −8.54562e−002

VARIOUS DATA

| Focal Length: | 38.32 (when diopter is −1) |
|---|---|
| FNO | 2.06 |
| Half Angle of View: (°) | 0.164 |
| BF | 3.11 |

| | 0 dptr | −1 dptr | +2 dptr |
|---|---|---|---|
| d 2 | 1.18 | 1.61 | 0.80 |
| d 8 | 1.67 | 1.24 | 2.05 |

Numerical Example 8

UNIT: mm

Surface Data

| Surface No. | r | d | nd | vd |
|---|---|---|---|---|
| (Line of sight detection system) | | | | |
| 1 | ∞ | 0.80 | 1.51633 | 64.1 |
| 2 | ∞ | (Variable) | | |
| 3* | 16.724 | 5.27 | 1.85135 | 40.1 |
| 4 | −36.577 | 1.12 | | |
| 5 | −33.437 | 2.65 | 1.63550 | 23.9 |
| 6* | 7.971 | 3.47 | | |
| 7* | 19.285 | 5.11 | 1.85135 | 40.1 |
| 8 | −24.766 | (Variable) | | |
| 9 | ∞ | 18.05 | 1.65844 | 50.9 |
| 10 | ∞ | 0.60 | | |
| 11(Diaphragm) | 29.478 | 2.00 | 1.58306 | 30.2 |
| 12* | −1.441 | 2.16 | | |
| Image Plane | ∞ | | | |
| (Observation optical system) | | | | |
| 1 | ∞ | 0.80 | 1.51633 | 64.1 |
| 2 | ∞ | (Variable) | | |
| 3* | 16.724 | 5.27 | 1.85135 | 40.1 |
| 4 | −36.577 | 1.12 | | |
| 5 | −33.437 | 2.65 | 1.63550 | 23.9 |
| 6* | 7.971 | 3.47 | | |
| 7* | 19.285 | 5.11 | 1.85135 | 40.1 |
| 8 | −24.766 | (Variable) | | |
| 9 | ∞ | 12.00 | 1.65844 | 50.9 |
| 10 | ∞ | 2.22 | | |
| Display panel plane | ∞ | | | |

ASPHERIC DATA

3rd Surface

K = 0.00000e+000 A 4 = −8.37321e−005 A 6 = −4.91699e−008

6th Surface

K = −7.14300e−001 A 4 = −2.40436e−004

7th Surface

K = 0.00000e+000 A 4 = −6.65184e−005

12th Surface

K = −9.58889e−001 A 4 = −7.99335e−002 A 6 = 2.40004e−001 A 8 = −2.58203e−001

VARIOUS DATA

| Focal Length: | 7.57 (when diopter is −1) |
|---|---|
| FNO | 4.08 |
| Half Angle of View: (°) | 4.18 |
| BF | 2.16 |

| | 0 dptr | −1 dptr | +2 dptr |
|---|---|---|---|
| d 2 | 1.16 | 1.58 | 0.80 |
| d 8 | 1.98 | 1.56 | 2.33 |

-continued

UNIT: mm

Lens Unit Data

| Lens Unit | Starting Surface | Focal Length: |
|---|---|---|
| 1 | 3 | 19.28 |
| 2 | 11 | 2.41 |

Numerical Example 9

UNIT: mm

Surface Data

| Surface No. | r | d | nd | vd |
|---|---|---|---|---|
| (Line of sight detection system) | | | | |
| 1 | ∞ | 0.80 | 1.51633 | 64.1 |
| 2 | ∞ | (Variable) | | |
| 3* | 13.712 | 6.00 | 1.76802 | 49.2 |
| 4 | 187.742 | 0.15 | | |
| 5* | 16.198 | 2.20 | 1.63550 | 23.9 |
| 6* | 5.523 | 3.52 | | |
| 7* | 14.293 | 4.45 | 1.76802 | 49.2 |
| 8 | −58.830 | (Variable) | | |
| 9 | ∞ | 3.00 | 1.83400 | 37.2 |
| 10 | ∞ | 0.60 | | |
| 11*(Diaphragm) | 2.498 | 2.00 | 1.49171 | 57.4 |
| 12* | −0.825 | 0.60 | | |
| 13 | ∞ | 0.75 | 1.55300 | 38.0 |
| 14 | ∞ | 1.20 | | |
| Image Plane | ∞ | | | |
| (Observation optical system) | | | | |
| 1 | ∞ | 0.80 | 1.51633 | 64.1 |
| 2 | ∞ | (Variable) | | |
| 3* | 13.712 | 6.00 | 1.76802 | 49.2 |
| 4 | −187.742 | 0.15 | | |
| 5* | 16.198 | 2.20 | 1.63550 | 23.9 |
| 6* | 5.523 | 3.52 | | |
| 7* | 14.293 | 4.45 | 1.76802 | 49.2 |
| 8 | −58.830 | (Variable) | | |
| 9 | ∞ | 12.00 | 1.83400 | 37.2 |
| 10 | ∞ | 0.41 | | |
| Display panel plane | ∞ | | | |

ASPHERIC DATA

3rd Surface

K = −1.83270e+000 A 4 = 1.51941e−005 A 6 = 4.23288e−007 A 8 = −3.98958e−009 A10 = 1.14377e−011

5th Surface

K = −7.67553e+000 A 4 = −2.88147e−004 A 6 = 3.08918e−006 A 8 = −1.32371e−008 A10 = 1.78749e−011

6th Surface

K = −1.89824e+000 A 4 = −4.01320e−005 A 6 = 1.65020e−006 A 8 = 8.03262e−009 A10 = −8.75967e−011

7th Surface

K = −7.01803e−001 A 4 = −8.40229e−005 A 6 = 6.12255e−007 A 8 = −7.74356e−009 A10 = 4.18240e−011

11th Surface

K = 4.15727e+000 A 4 = −9.50353e−001 A 6 = 1.93448e+000 A 8 = −1.86456e+000 A10 = 6.25846e−001

-continued

UNIT: mm

12th Surface

K = −1.29048e+000 A 4 = −6.72136e−002 A 6 = −8.51031e−002 A 8 = 3.20341e−002 A10 = −1.55152e−002

VARIOUS DATA

| Focal Length: | 5.46 (when diopter is −1) |
|---|---|
| FNO | 5.13 |
| Half Angle of View: (°) | 6.18 |
| BF | 1.20 |

| | 0 dptr | −1 dptr | +2 dptr | −4 dptr |
|---|---|---|---|---|
| d 2 | 1.45 | 1.80 | 0.62 | 3.09 |
| d 8 | 2.72 | 2.36 | 3.55 | 1.07 |

Zoom Lens Unit Data

| Lens Unit | Starting Surface | Focal Length: |
|---|---|---|
| 1 | 3 | 18.70 |
| 2 | 11 | 1.57 |

Numerical Example 10

UNIT: mm

Surface Data

| Surface No. | r | d | nd | vd |
|---|---|---|---|---|
| (Line of sight detection system) | | | | |
| 1 | ∞ | 0.80 | 1.51633 | 64.1 |
| 2 | ∞ | (Variable) | | |
| 3* | 13.712 | 6.00 | 1.76802 | 49.2 |
| 4 | −187.742 | 0.15 | | |
| 5* | 16.198 | 2.20 | 1.63550 | 23.9 |
| 6* | 5.523 | 3.52 | | |
| 7* | 14.293 | 4.45 | 1.76802 | 49.2 |
| 8 | −58.830 | (Variable) | | |
| 9 | ∞ | 40.00 | 1.83400 | 37.2 |
| 11 | ∞ | 0.10 | | |
| 12 | ∞ | 0.50 | | |
| 13*(Diaphragm) | 2.498 | 2.00 | 1.49171 | 57.4 |
| 14* | −0.825 | 0.60 | | |
| 15 | ∞ | 0.75 | 1.55300 | 38.0 |
| 16 | ∞ | 0.99 | | |
| Image Plane | ∞ | | | |
| (Observation optical system) | | | | |
| 1 | ∞ | 0.80 | 1.51633 | 64.1 |
| 2 | ∞ | (Variable) | | |
| 3* | 13.712 | 6.00 | 1.76802 | 49.2 |
| 4 | −187.742 | 0.15 | | |
| 5* | 16.198 | 2.20 | 1.63550 | 23.9 |
| 6* | 5.523 | 3.52 | | |
| 7* | 14.293 | 4.45 | 1.76802 | 49.2 |
| 8 | −58.830 | (Variable) | | |
| 9 | ∞ | 10.00 | 1.83400 | 37.2 |
| 11 | ∞ | 1.50 | | |
| Display panel plane | ∞ | | | |

ASPHERIC DATA

3rd Surface

K = −1.83270e+000 A 4 = 1.51941e−005 A 6 = 4.23288e−007 A 8 = −3.98958e−009 A10 = 1.14377e−011

-continued

UNIT: mm

5th Surface

K = −7.67553e+000 A 4 = −2.88147e−004 A 6 = 3.08918e−006
A 8 = −1.32371e−008 A10 = 1.78749e−011

6th Surface

K = −1.89824e+000 A 4 = −4.01320e−005 A 6 = 1.65020e−006
A 8 = 8.03262e−009 A10 = −8.75967e−011

7th Surface

K = −7.01803e−001 A 4 = −8.40229e−005 A 6 = 6.12255e−007
A 8 = −7.74356e−009 A10 = 4.18240e−011

13th Surface

K = 4.15727e+000 A 4 = −9.50353e−001 A 6 = 1.93448e+000
A 8 = −1.86456e+000 A10 = 6.25846e−001

14th Surface

K = −1.29048e+000 A 4 = −6.72136e−002 A 6 = −8.51031e−002
A 8 = 3.20341e−002 A10 = −1.55152e−002

VARIOUS DATA

| Focal Length: | −1.99 (when diopter is −1) |
|---|---|
| FNO | 4.93 |
| Half Angle of View: (°) | 13.5 |
| BF | 0.24 |

| | 0 dptr | −1 dptr | +2 dptr | −4 dptr |
|---|---|---|---|---|
| d 2 | 1.45 | 1.80 | 0.62 | 3.09 |
| d 8 | 2.72 | 2.36 | 3.55 | 1.07 |

Zoom Lens Unit Data

| Lens Unit | Starting Surface | Focal Length: |
|---|---|---|
| 1 | 3 | 18.70 |
| 2 | 13 | 1.57 |

Numerical Example 11

UNIT: mm

Surface Data

| Surface No. | r | d | nd | vd |
|---|---|---|---|---|
| (Line of sight detection system) | | | | |
| 1 | ∞ | 0.80 | 1.51633 | 64.1 |
| 2 | ∞ | (Variable) | | |
| 3* | 14.988 | 3.62 | 1.53480 | 55.7 |
| 4 | 199.217 | 0.20 | | |
| 5* | 24.619 | 5.51 | 1.69350 | 53.2 |
| 6 | −33.755 | 0.20 | | |
| 7 | 30.413 | 2.65 | 1.63550 | 23.9 |
| 8* | 5.788 | 3.32 | | |
| 9* | 9.853 | 5.50 | 1.69350 | 53.2 |
| 10 | 804.888 | (Variable) | | |
| 11 | ∞ | 5.48 | 1.83400 | 37.2 |
| 12 | ∞ | 0.60 | | |
| 13*(Diaphragm) | 2.498 | 2.00 | 1.49171 | 57.4 |
| 14* | −0.825 | 0.60 | | |
| 15 | ∞ | 0.75 | 1.55300 | 38.0 |
| 16 | ∞ | 1.03 | | |
| Image Plane | ∞ | | | |
| (Observation optical system) | | | | |
| 1 | ∞ | 0.80 | 1.51633 | 64.1 |
| 2 | ∞ | (Variable) | | |
| 3* | 14.988 | 3.62 | 1.53480 | 55.7 |
| 4 | 199.217 | 0.20 | | |
| 5* | 24.619 | 5.51 | 1.69350 | 53.2 |
| 6 | −33.755 | 0.20 | | |
| 7 | 30.413 | 2.65 | 1.63550 | 23.9 |
| 8* | 5.788 | 3.32 | | |
| 9* | 9.853 | 5.50 | 1.69350 | 53.2 |
| 10 | 804.888 | (Variable) | | |
| 11 | ∞ | 5.00 | 1.83400 | 37.2 |
| 12 | ∞ | 0.06 | | |
| Display panel plane | ∞ | | | |

ASPHERIC DATA

3rd Surface

K = 0.00000e+000 A4 = −1.71727e−004 A 6 = 1.43175e−007

5th Surface

K = 0.00000e+000 A 4 = 2.14950e−005 A 6 = −2.09458e−007

8th Surface

K = −9.99847e−001 A4 = 1.21742e−004

9th Surface

K = 0.00000e+000 A 4 = −1.55543e−004 A 6 = −1.15473e−006

13th Surface

K = 4.15727e+000 A 4 = −9.50353e−001 A 6 = 1.93448e+000
A 8 = −1.86456e+000 A10 = 6.25846e−001

14th Surface

K = −1.29048e+000 A 4 = −6.72136e−002 A 6 = −8.51031e−002
A 8 = 3.20341e−002 A10 = −1.55152e−002

VARIOUS DATA

| Focal Length: | −133.49 (when diopter is −1) |
|---|---|
| FNO | 16.5 |
| Half Angle of View: (°) | 0.28 |
| BF | 5.19 |

| | 0 dptr | −1 dptr | +2 dptr | −4 dptr |
|---|---|---|---|---|
| d 2 | 1.05 | 1.34 | 0.50 | 2.22 |
| d10 | 1.85 | 1.56 | 2.40 | 0.69 |

Zoom Lens Unit Data

| Lens Unit | Starting Surface | Focal Length: |
|---|---|---|
| 1 | 3 | 16.75 |
| 2 | 13 | 1.57 |

TABLES 1-3 show various values corresponding to the numerical examples.

TABLE 1

| | Ex. 1 | Ex. 2 | Ex. 3 | Ex. 4 |
|---|---|---|---|---|
| (1) | 1.174 | 1.099 | 1.099 | 1.174 |
| (2) | 13.37 | 12.97 | 12.97 | 12.85 |
| (4) | 0.50 | 0.91 | 0.76 | 0.49 |
| (5) | 1.83 | 1.66 | 1.66 | 1.83 |
| (6) | 37.16 | 50.88 | 50.88 | 37.16 |
| (7) | 1.27 | 0.83 | 0.93 | 1.25 |
| (8) | 11.89 | 7.99 | 8.96 | 11.68 |
| (9) | 1.87 | 2.58 | 0.44 | 1.81 |
| (10) | 0.16 | 0.32 | 0.05 | 0.15 |

TABLE 2

|      | Ex. 5 | Ex. 6 | Ex. 7 | Ex. 8 |
|------|-------|-------|-------|-------|
| (1)  | 1.210 | 1.004 | 1.004 | 1.083 |
| (2)  | 13.36 | 12.74 | 12.74 | 12.97 |
| (4)  | 0.22  | 1.21  | 1.58  | 0.91  |
| (5)  | 1.66  | 1.66  | 1.66  | 1.66  |
| (6)  | 50.88 | 50.88 | 50.88 | 50.88 |
| (7)  | 1.08  | 0.80  | 0.64  | 0.83  |
| (8)  | 10.10 | 7.82  | 6.29  | 7.99  |
| (9)  | 1.83  | 3.20  | 0.51  | 2.55  |
| (10) | 0.18  | 0.41  | 0.08  | 0.32  |

TABLE 3

|      | Ex. 9 | Ex. 10 | Ex. 11 |
|------|-------|--------|--------|
| (1)  | 0.729 | 1.808  | 1.031  |
| (2)  | 13.37 | 13.37  | 14.93  |
| (4)  | 0.50  | 0.50   | 0.50   |
| (5)  | 1.83  | 1.83   | 1.83   |
| (6)  | 37.16 | 37.16  | 37.16  |
| (7)  | 1.27  | 1.27   | 1.27   |
| (8)  | 11.89 | 11.89  | 10.65  |
| (9)  | 3.42  | 9.40   | 0.13   |
| (10) | 0.29  | 0.79   | 0.01   |

Image Pickup Apparatus

Figure 25:
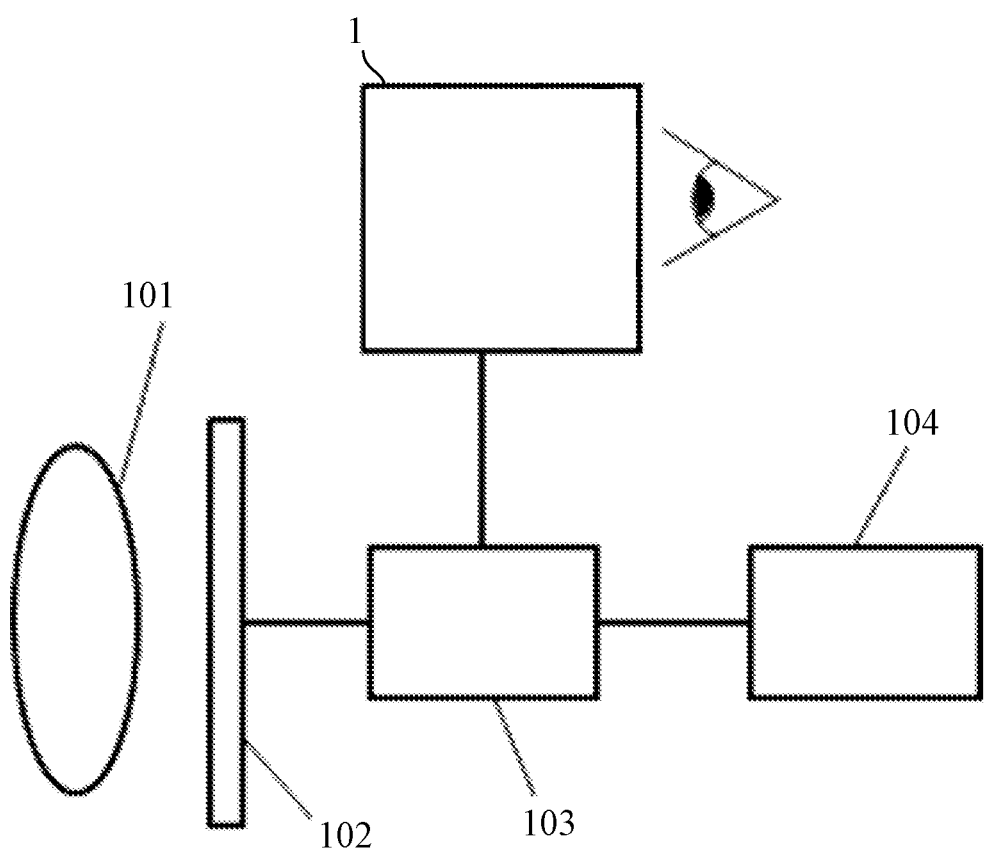
FIG. 25 is a schematic view of an image pickup apparatus.

Referring now to FIG. 25, a description will be given of an embodiment of an image pickup apparatus that includes the observation apparatus 1 (which may be any one of the observation apparatuses according to the above examples) described with reference to FIG. 1. FIG. 25 is a schematic view of an image pickup apparatus that includes the observation apparatus 1. An object image formed by an imaging optical system 101 is converted into an electric signal by an image sensor 102, which is a photoelectric conversion element. The image sensor 102 can use a CCD sensor, a CMOS sensor, or the like.

An output signal from the image sensor 102 is processed by an image processing circuit 103 to form an image. The formed image is recorded on a recording medium 104 such as a semiconductor memory, a magnetic tape, or an optical disc. The image formed in the image processing circuit 103 is displayed in the observation apparatus 1.

Each example can provide an observation apparatus and an image pickup apparatus having the same, each of which can suppress an image magnification and its fluctuations of the line of sight detection system while ensuring a wide field of view and a sufficient eye point length.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-129660, filed on Jul. 30, 2020, which is hereby incorporated by reference herein in its entirety.

What is claimed is:

1. An observation apparatus comprising an observation optical system and a line of sight detection system,
wherein the observation optical system includes, in order from a display element side to an observation side, an optical path splitter configured to split an optical path, and a first lens unit having a positive refractive power,
wherein the line of sight detection system includes a second lens unit configured to image light incident on the first lens unit and split by the optical path splitter, and
wherein the following inequalities are satisfied:

$0.4 < L/f1 < 2.0$ $11 < \beta r < 16$ $\beta r = 250 \text{ [mm]}/f1$ where L is a distance on an optical axis from a rear principal point position of the first lens unit to a lens surface closest to an observation position of the second lens unit, f1 is a focal length of the first lens unit, and βr is a loupe magnification of the first lens unit.

2. The observation apparatus according to claim 1, wherein the following inequality is satisfied:

$0.05 < (f2R1+f2R2)/(f2R1-f2R2) < 3.00$ where f2R1 is a radius of curvature of a lens surface on the observation side of a positive lens closest to the observation position in the second lens unit, and f2R2 is a radius of curvature of a lens surface on an imaging plane side of the line of sight detection system of the positive lens.

3. The observation apparatus according to claim 1, wherein the optical path splitter includes a prism, and
wherein the following inequality is satisfied:

$1.45 < Ndp1 < 2.10$ where Ndp1 is a refractive index of the prism for d-line.

4. The observation apparatus according to claim 1, wherein the optical path splitter includes a prism, and
wherein the following inequality is satisfied:

$20 < vdp1 < 60$ where vdp1 is an Abbe number of the prism for d-line.

5. The observation apparatus according to claim 1, wherein the following inequality is satisfied:

$0.3 < d/f2 < 1.5$ where d is a distance on the optical axis from the lens surface closest to the observation position of the second lens unit to a lens surface closest to an imaging plane of the line of sight detection system of the second lens unit, and f2 is a focal length of the second lens unit.

6. The observation apparatus according to claim 1, wherein the following inequality is satisfied:

$4 < f1/f2 < 20$ where f2 is a focal length of the second lens unit.

7. The observation apparatus according to claim 1, wherein the following inequality is satisfied:

$0.01 < f1/|f| < 15.00$ where f is a focal length of the observation apparatus.

8. The observation apparatus according to claim 1, wherein the following inequality is satisfied:

$0.002 < f2/|f| < 1.100$ where f2 is a focal length of the second lens unit, and f is a focal length of the observation apparatus.

9. An image pickup apparatus comprising:
a sensor configured to receive an image formed by an optical system; and
an observation apparatus used to observe an image corresponding to the image,
wherein the observation apparatus includes an observation optical system and a line of sight detection system, wherein the observation optical system includes, in order from a display element side to an observation side, an optical path splitter configured to split an optical path and a first lens unit having a positive refractive power, wherein the line of sight detection system includes a second lens unit configured to image light incident on the first lens unit and split by the optical path splitter, and wherein the following inequalities are satisfied:

$$0.4 < L/f1 < 2.0$$

$$11 < \beta r < 16$$

$$\beta r = 250 \text{ [mm]}/f1$$

where L is a distance on an optical axis from a rear principal point position of the first lens unit to a lens surface closest to an observation position of the second lens unit, f1 is a focal length of the first lens unit, and $\beta r$ is a loupe magnification of the first lens unit.

10. The image pickup apparatus according to claim 9, wherein the following inequality is satisfied:

$$0.05 < (f2R1 + f2R2)/(f2R1 - f2R2) < 3.00$$

where f2R1 is a radius of curvature of a lens surface on the observation side of a positive lens closest to the observation position in the second lens unit, and f2R2 is a radius of curvature of a lens surface on an imaging plane side of the line of sight detection system of the positive lens.

11. The image pickup apparatus according to claim 9, wherein the optical path splitter includes a prism, and
wherein the following inequality is satisfied:

$$1.45 < Ndp1 < 2.10$$

where Ndp1 is a refractive index of the prism for d-line.

12. The image pickup apparatus according to claim 9, wherein the optical path splitter includes a prism, and
wherein the following inequality is satisfied:

$$20 < vdp1 < 60$$

where vdp1 is an Abbe number of the prism for d-line.

13. The image pickup apparatus according to claim 9, wherein the following inequality is satisfied:

$$0.3 < d/f2 < 1.5$$

where d is a distance on the optical axis from the lens surface closest to the observation position of the second lens unit to a lens surface closest to an imaging plane of the line of sight detection system of the second lens unit, and f2 is a focal length of the second lens unit.

14. The image pickup apparatus according to claim 9, wherein the following inequality is satisfied:

$$4 < f1/f2 < 20$$

where f2 is a focal length of the second lens unit.

15. The image pickup apparatus according to claim 9, wherein the following inequality is satisfied:

$$0.01 < f1/|f| < 15.00$$

where f is a focal length of the observation apparatus.

16. The image pickup apparatus according to claim 9, wherein the following inequality is satisfied:

$$0.002 < f2/|f| < 1.100$$

where f2 is a focal length of the second lens unit, and f is a focal length of the observation apparatus.

* * * * *